SINGLE BOOM DERRICK UNITS

Filed Sept. 4, 1962 16 Sheets-Sheet 1

INVENTORS
ROY O. BALOGH
ROBERT G. BAKULA
BY Alfred W. Petchaft
ATTORNEY

SINGLE BOOM DERRICK UNITS

Filed Sept. 4, 1962 16 Sheets-Sheet 2

INVENTOR.
ROY O. BALOGH
ROBERT G. BAKULA
BY
Alfred W. Petchaft
ATTORNEY

INVENTOR.
ROY O. BALOGH
ROBERT G. BAKULA
BY Alfred W. Petchaft
ATTORNEY

SINGLE BOOM DERRICK UNITS

Filed Sept. 4, 1962 16 Sheets-Sheet 4

INVENTOR.
ROY O. BALOGH
ROBERT G. BAKULA
BY Alfred W. Petchaft
ATTORNEY

INVENTOR.
ROY O. BALOGH
ROBERT G. BAKULA
BY
Alfred W. Petchaft
ATTORNEY

INVENTOR.
ROY O. BALOGH
ROBERT G. BAKULA
BY
ATTORNEY

SINGLE BOOM DERRICK UNITS

Filed Sept. 4, 1962 16 Sheets-Sheet 7

INVENTOR.
ROY O. BALOGH
ROBERT G. BAKULA
BY
Alfred W. Petchaft
ATTORNEY

SINGLE BOOM DERRICK UNITS

INVENTOR.
ROY O. BALOGH
ROBERT G. BAKULA
BY Alfred W. Petchaft
ATTORNEY

INVENTOR.
ROY O. BALOGH
ROBERT G. BAKULA
BY
Alfred W. Petchaft
ATTORNEY

INVENTOR.
ROY O. BALOGH
ROBERT G. BAKULA
BY
Alfred W. Petchaft
ATTORNEY

SINGLE BOOM DERRICK UNITS

Filed Sept. 4, 1962 16 Sheets-Sheet 11

INVENTOR.
ROY O. BALOGH
ROBERT G. BAKULA
BY
Alfred W. Petchaft
ATTORNEY

INVENTOR.
ROY O. BALOGH
ROBERT G. BAKULA
BY
Alfred W. Petchaft
ATTORNEY

Oct. 27, 1964 R. O. BALOGH ETAL 3,154,199

SINGLE BOOM DERRICK UNITS

Filed Sept. 4, 1962 16 Sheets-Sheet 13

INVENTOR.
ROY O. BALOGH
ROBERT G. BAKULA

BY Alfred W. Petchaft

ATTORNEY

INVENTOR.
ROY O. BALOGH
ROBERT G. BAKULA
BY Alfred W. Petchaft
ATTORNEY

INVENTOR.
ROY O. BALOGH
ROBERT G. BAKULA
BY Alfred W. Petchaft
ATTORNEY

INVENTOR.
ROY O. BALOGH
ROBERT G. BAKULA
BY
Alfred W. Petchaft
ATTORNEY 3,154,199
Patented Oct. 27, 1964

3,154,199

SINGLE BOOM DERRICK UNITS

Roy O. Balogh, La Due, and Robert G. Bakula, Hanley Hills, Mo., assignors to McCabe-Powers Body Company, St. Louis, Mo., a corporation of Missouri Filed Sept. 4, 1962, Ser. No. 221,225
14 Claims. (Cl. 212—35)

This invention relates in general to certain new and useful improvements in rotatable derricks which are adapted for use on trucks or similar mobile platforms.

Many industrial organizations, such as public utilities, often use service maintenance trucks which are provided with some type of rotatable derrick. These derricks are usually provided with accessory devices for digging holes, setting poles into the ground, and for lifting various loads. The derrick usually is mounted on the truck body adjacent to the cab of the truck, and extends rearwardly over the bed of the truck in a substantially horizontal position or so-called "transport" position. When at the work site, the derrick is usually moved to its "work position" where it can assume a plurality of various positions with respect to the truck. Such derricks are usually capable of pivoting along a plane which is parallel to the longitudinal axis of the truck and it is also capable of rotating through an arc in a horizontal plane.

However, when the derrick is rotated to a position with the outer end thereof extending over one of the sides of the truck, it can only be lowered to a point where it abuts the upper margin of the truck body. It is, however, impossible to lower the derrick to a position where it is capable of operating some accessory device close to the ground. Oftentimes, it is desirable to attach a hole digger to the end of the derrick in order to drill a post hole. In order to function properly, the post hole digger must operate in a very close proximity to the ground level and, therefore, it is desirable to swing the derrick to a position where it is slightly above the ground level. Moreover, the derricks are often fitted with baskets mounted on the upper end thereof for work on telephone poles and high-electrical wires. It is, of course, desirable to lower the basket to a position for convenient loading and unloading of the personnel who are carried by the basket. Heretofore, there has been no derrick which is capable of being lowered to a point where the free end is in close proximity to the level of the ground.

It is, therefore, the primary object of the present invention to provide a portable derrick which can be quickly and efficiently swung from an inoperative transport position to various work positions.

It is another object of the present invention to provide a portable derrick of the type stated which may be mounted on a mobile platform such as a truck and which is capable of vertical and horizontal swinging movement.

It is an additional object of the present invention to provide a portable derrick of the type stated which is adapted for accommodating accessory devices such as hole diggers, work platforms, and the like.

It is also an object of the present invention to provide a portable derrick of the type stated with a unique hydraulic operating system whereby a great degree of extension can be achieved without causing critical deflection or distortion.

It is an additional object of the present invention to provide a portable derrick of the type stated which is constructed in a single unit and equipped with outriggers, so that the single unit derrick can be suitably mounted on any truck frame.

With the above and other objects in view, our invention resides in the novel features of form, construction, arrangement, and combination of parts presently described and pointed out in the claims.

In the accompanying drawings (sixteen sheets)—

Figures 1, 9, 23:
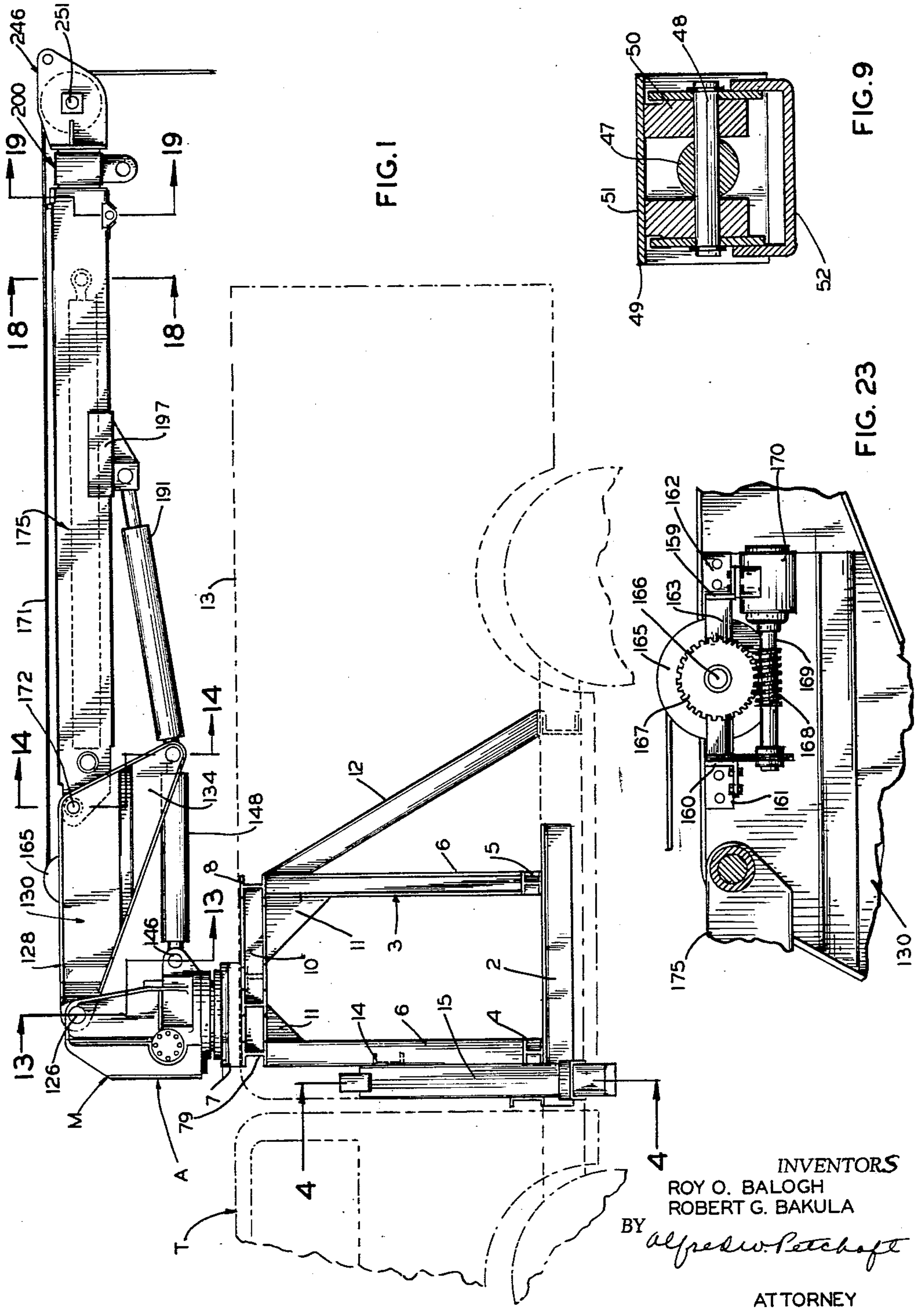
FIG. 1 is a side elevational view of a rotatable derrick constructed in accordance with and embodying the present invention, and being suitably mounted on a truck body.
Figure 2:
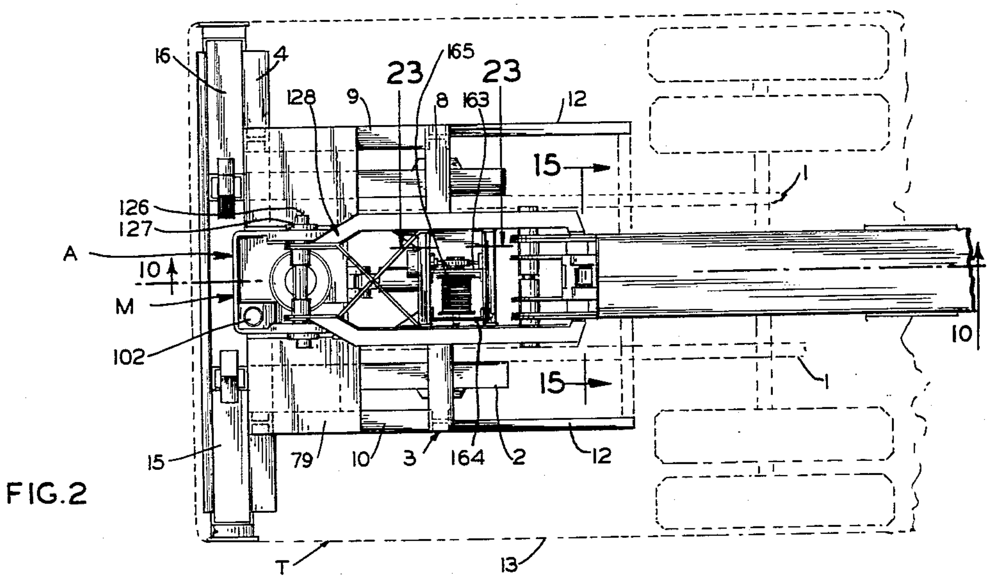
FIG. 2 is a top plan view of the rotatable derrick of FIG. 1.
Figures 4, 5, 6, 7, 8:
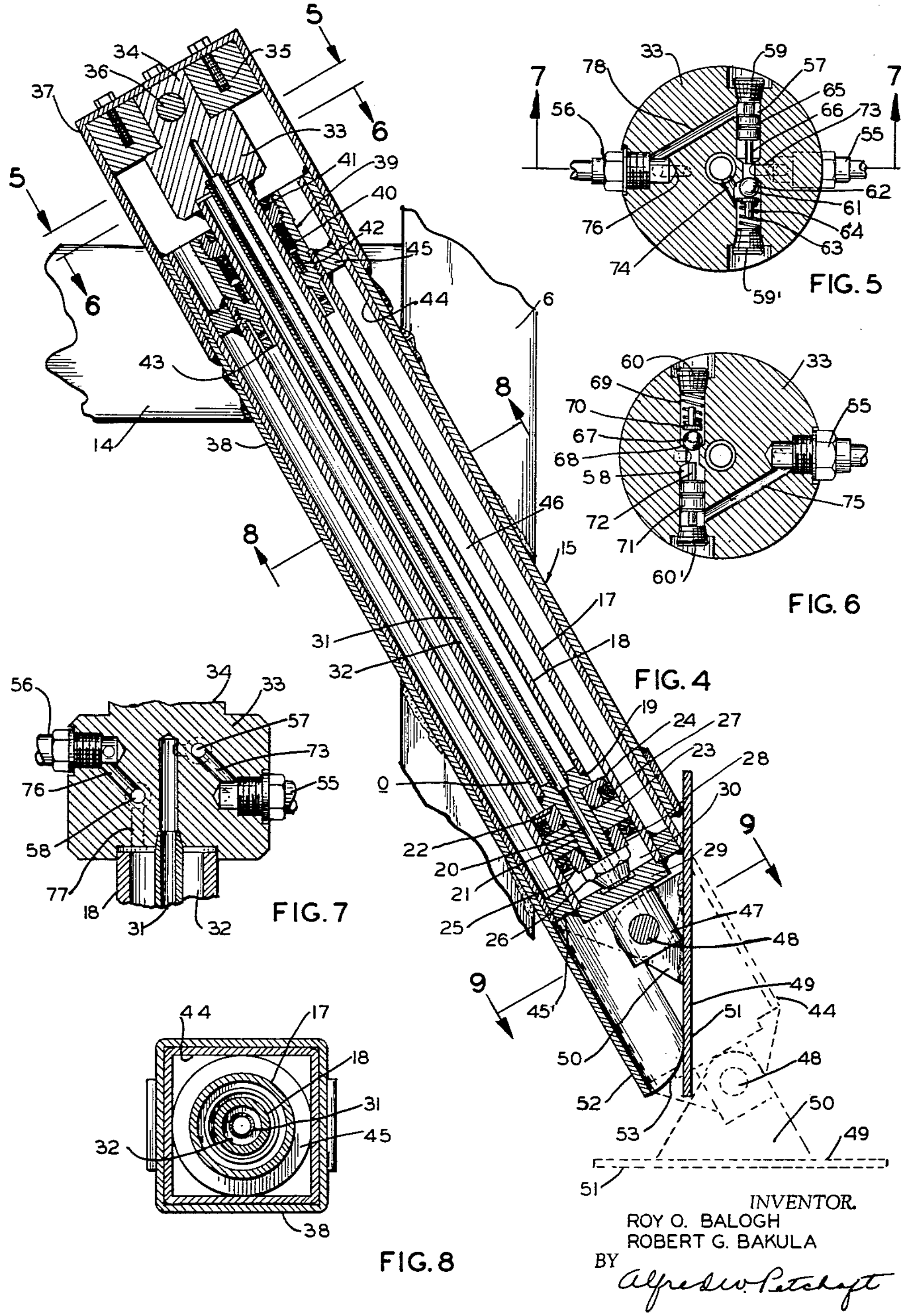
FIG. 4 is a fragmentary sectional view taken along line 4—4 of FIG. 1.
Figure 10:
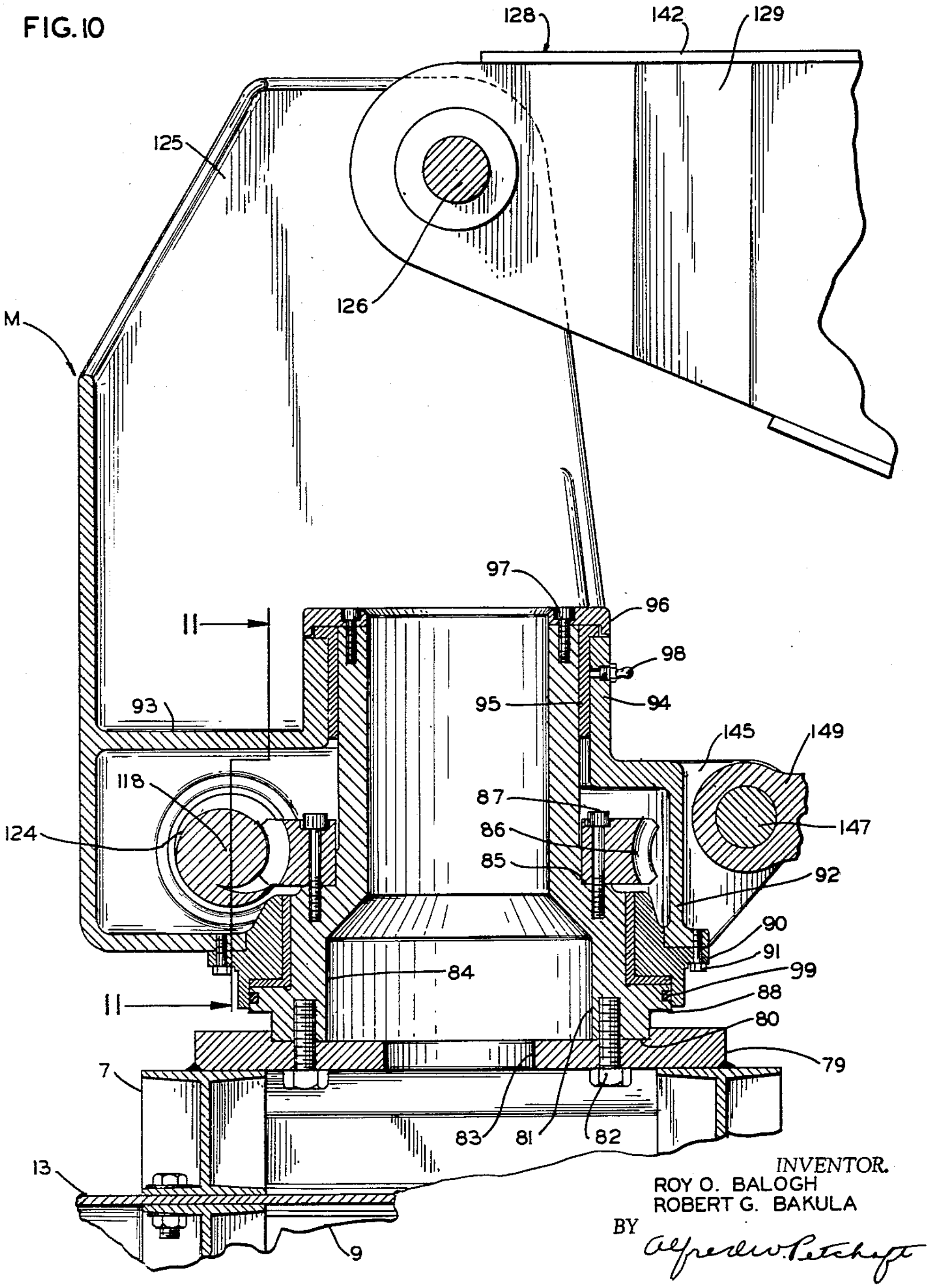
Figure 11:
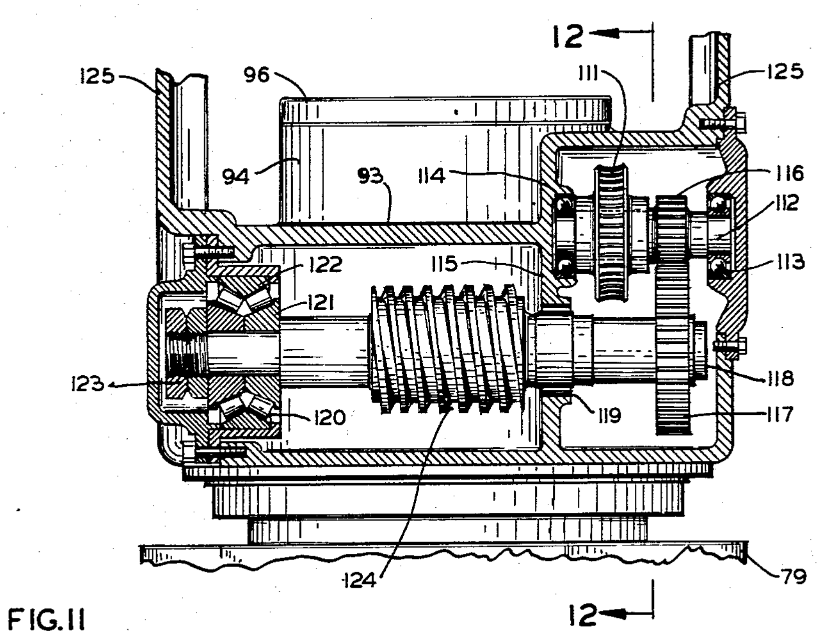
Figure 12:
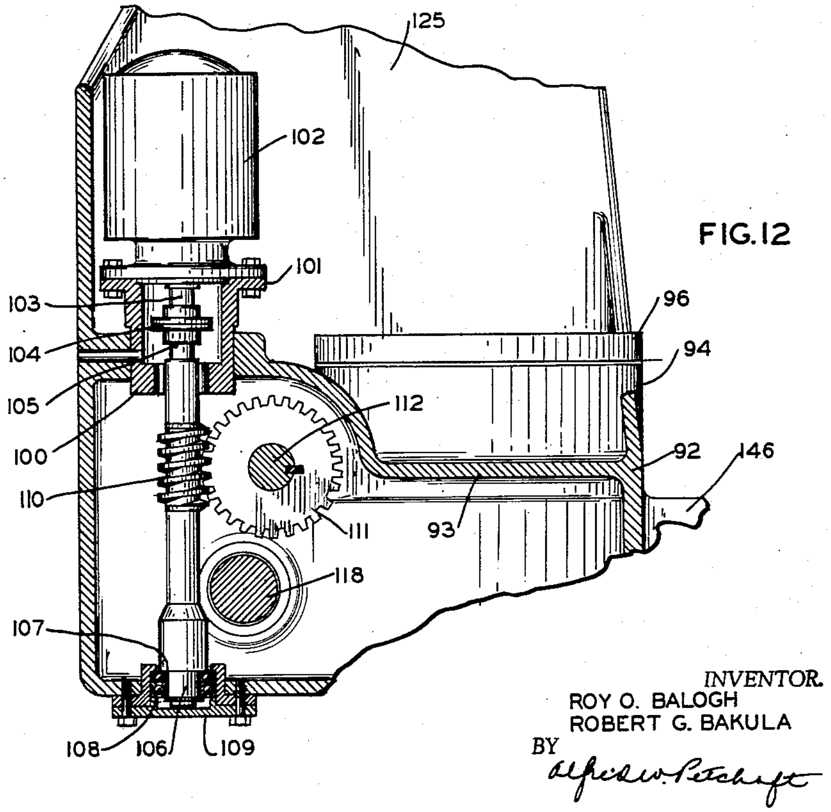
Figure 13:
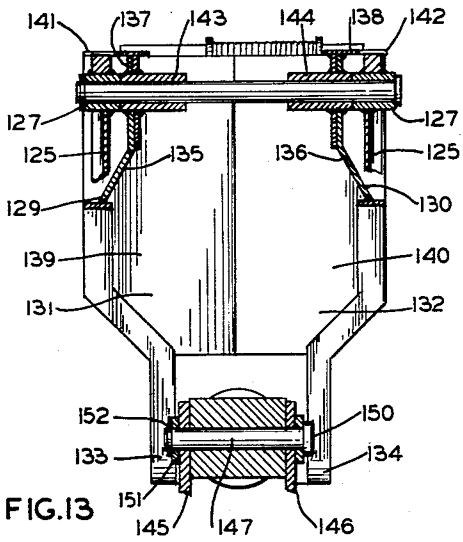
Figure 14:
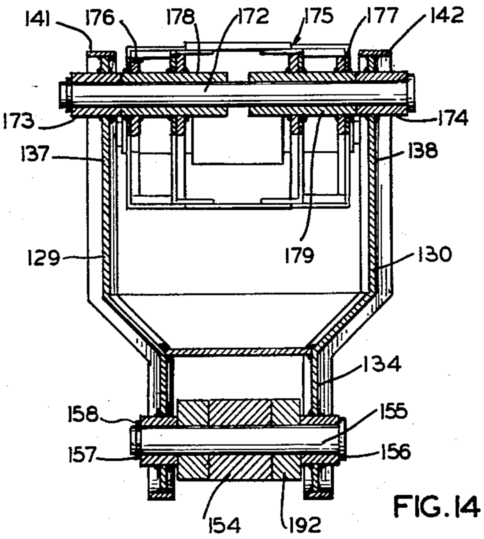
Figures 15, 16:
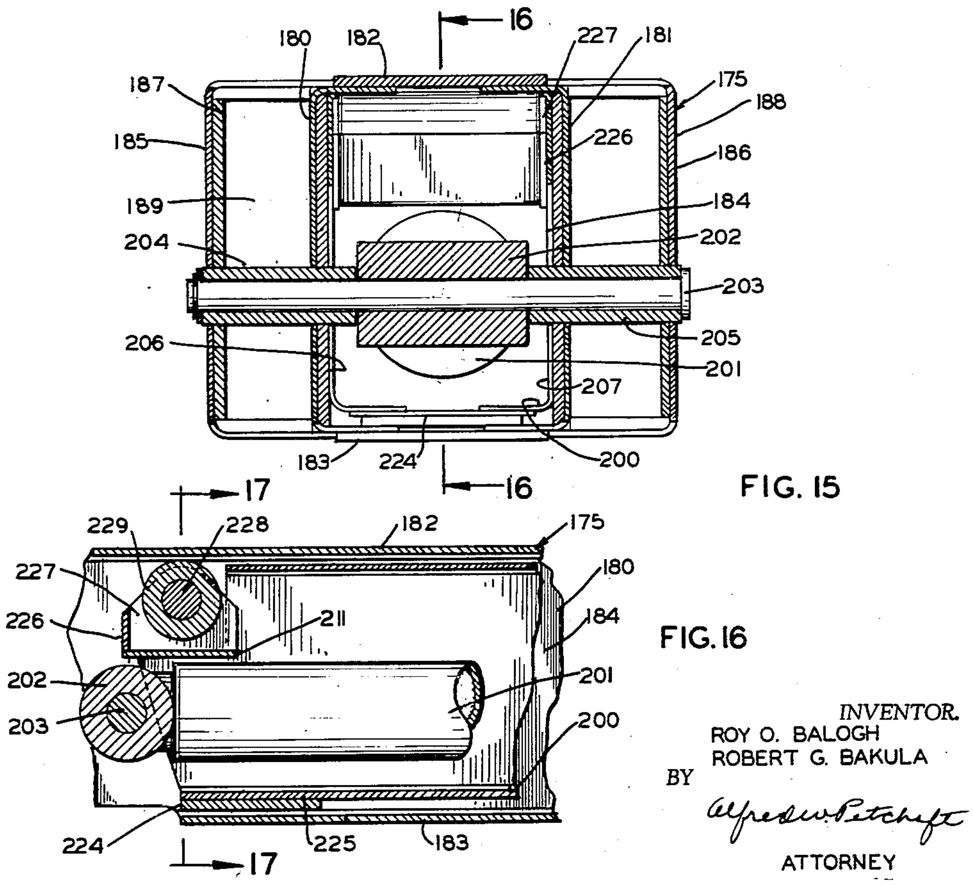
Figures 17, 18, 19:
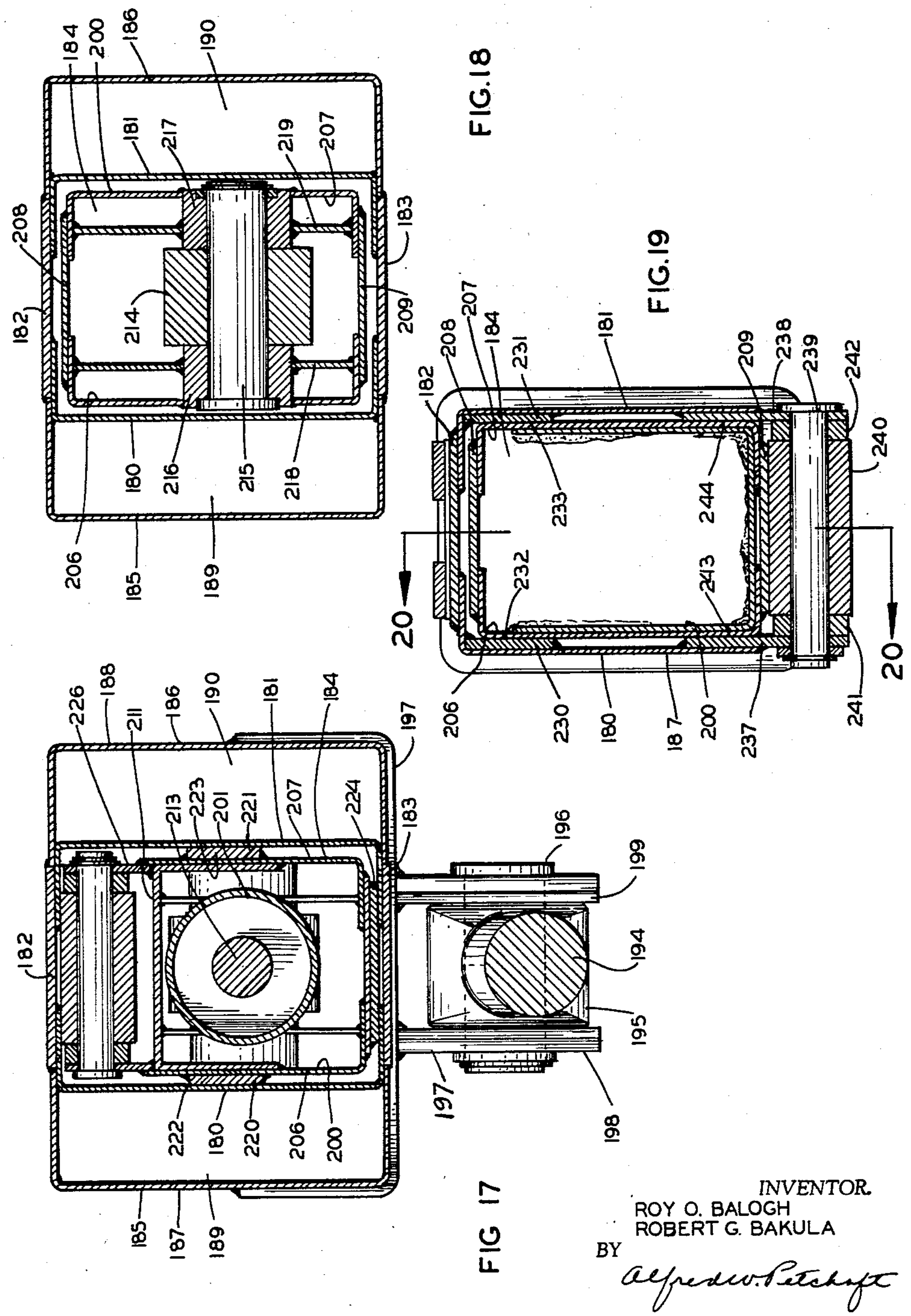
Figure 20:
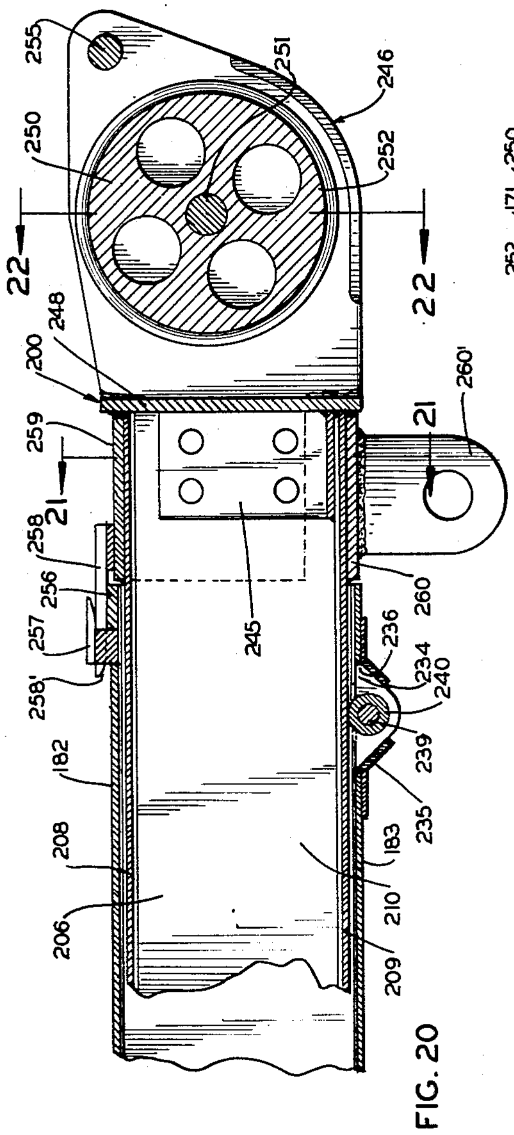
Figure 22:
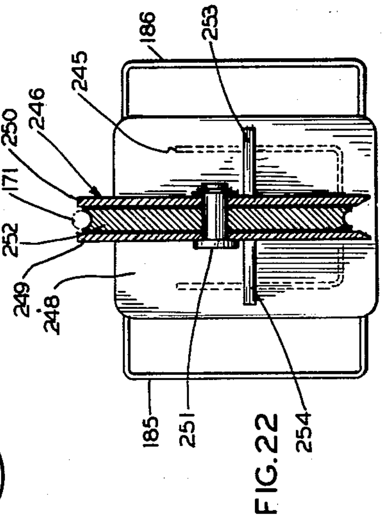
Figure 21:
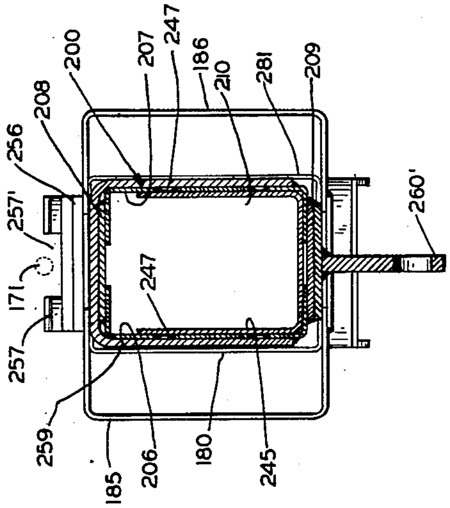
Figure 24:
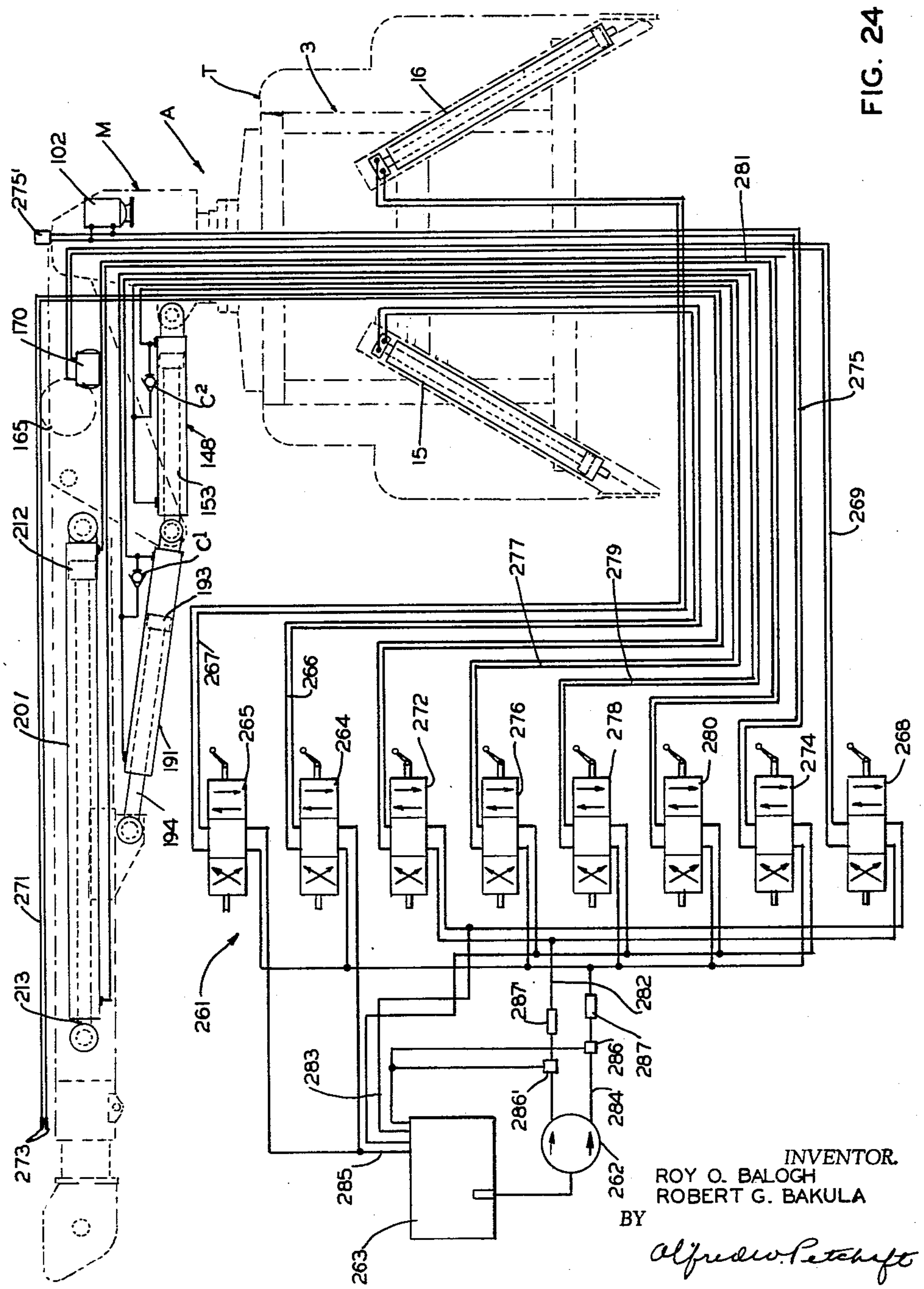
Figures 25, 28:
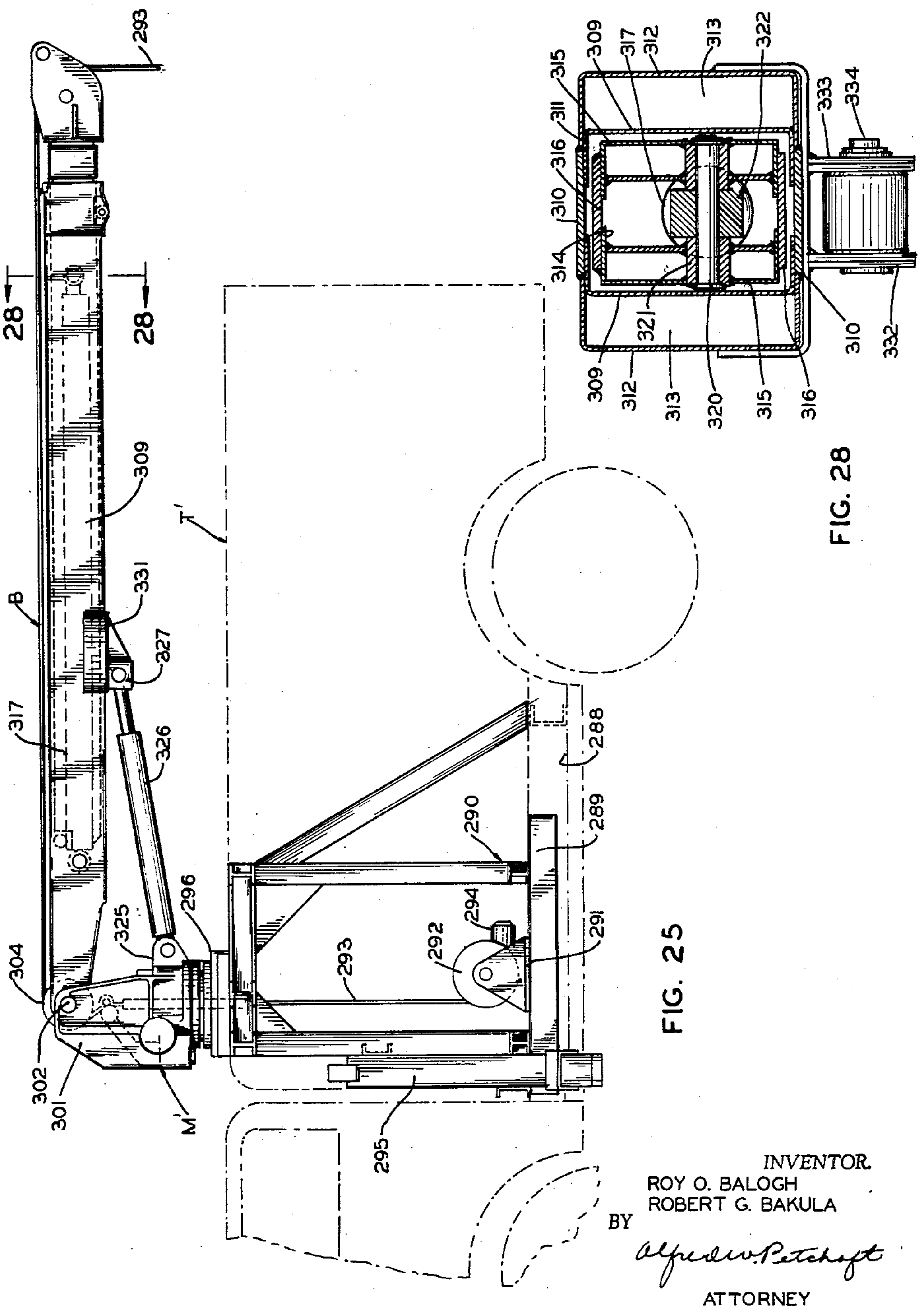
Figures 26, 27:
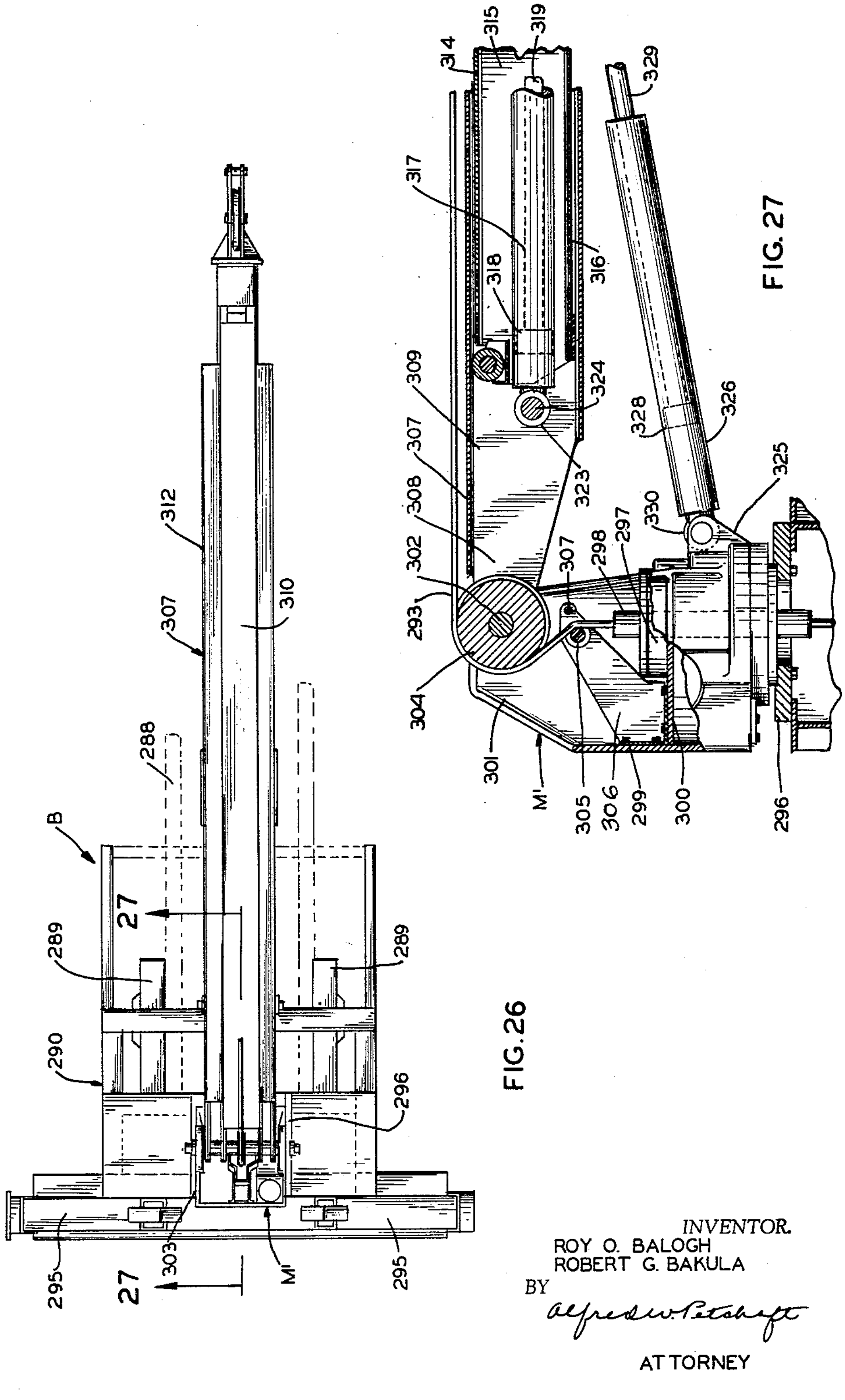
Figure 29:
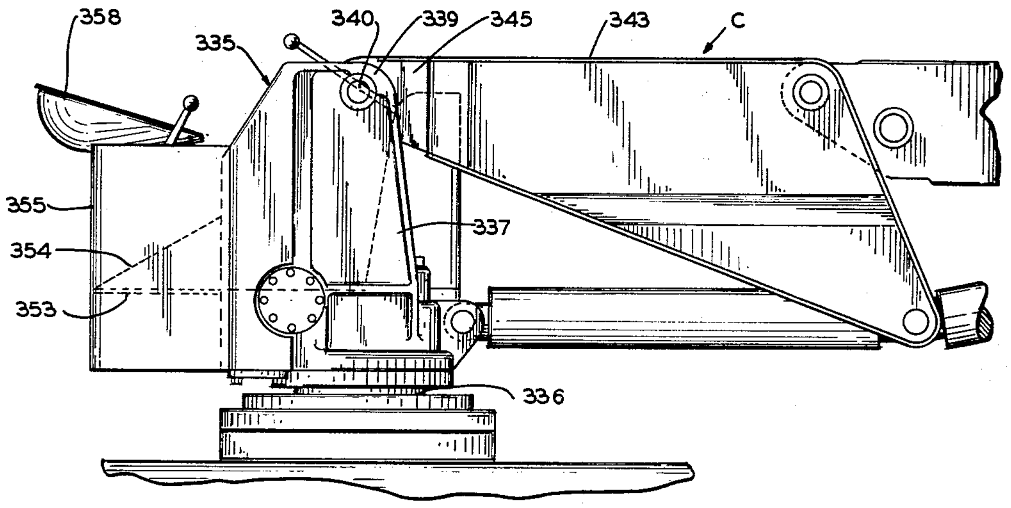
Figure 30:
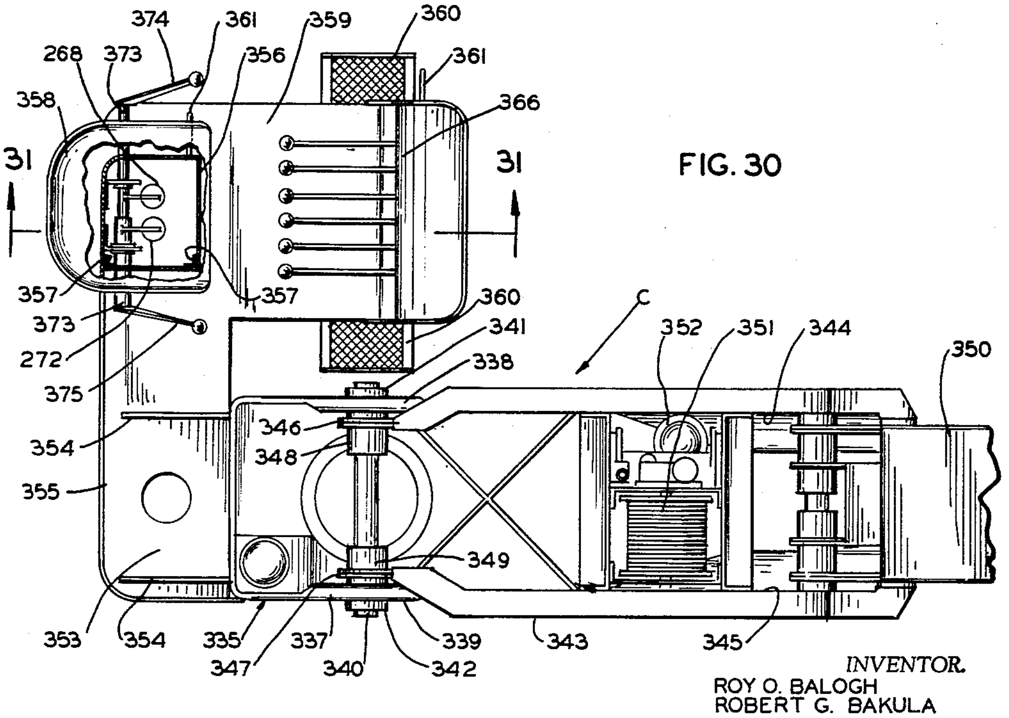
Figures 31, 32:
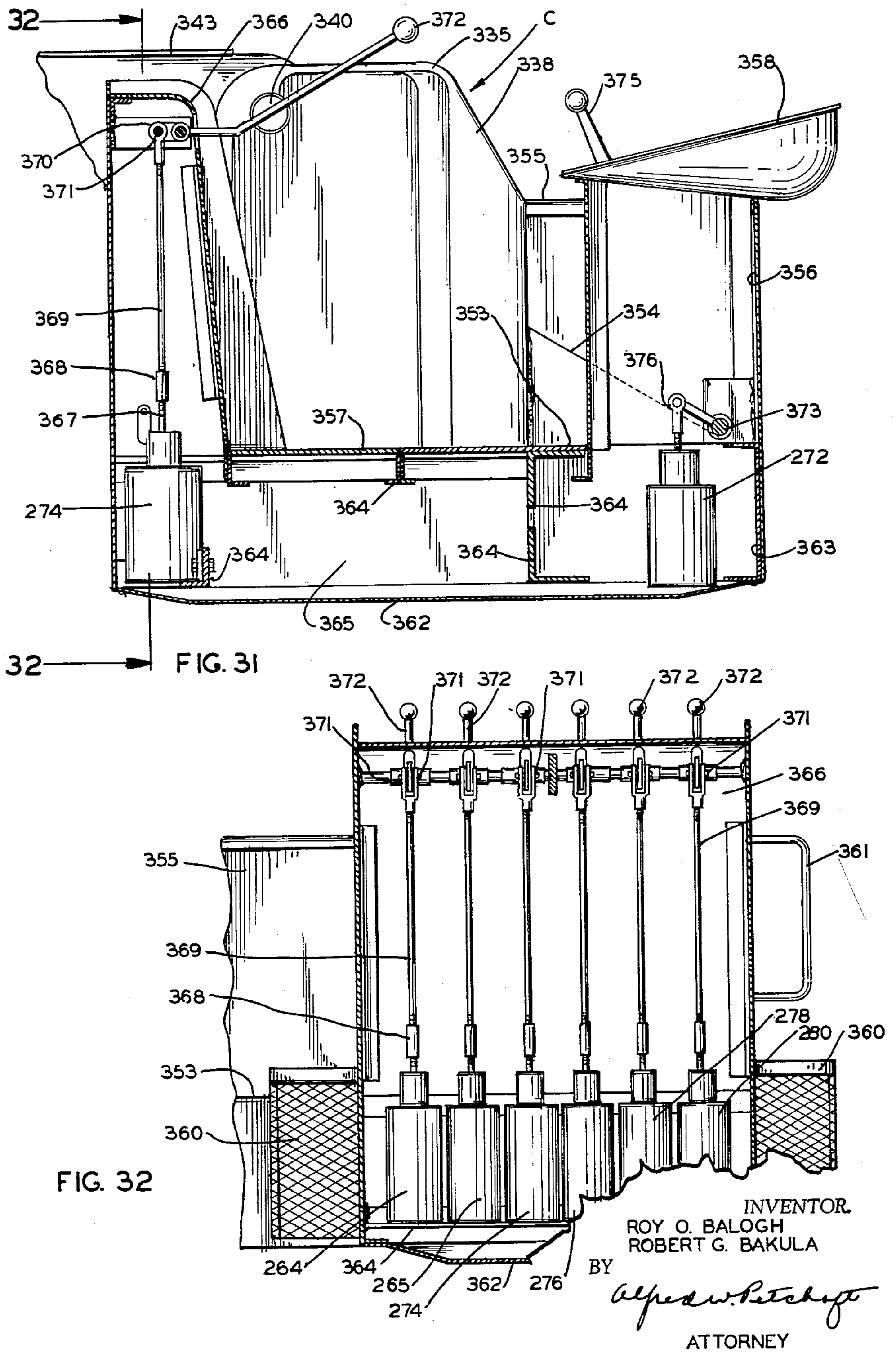
Figures 33, 34:
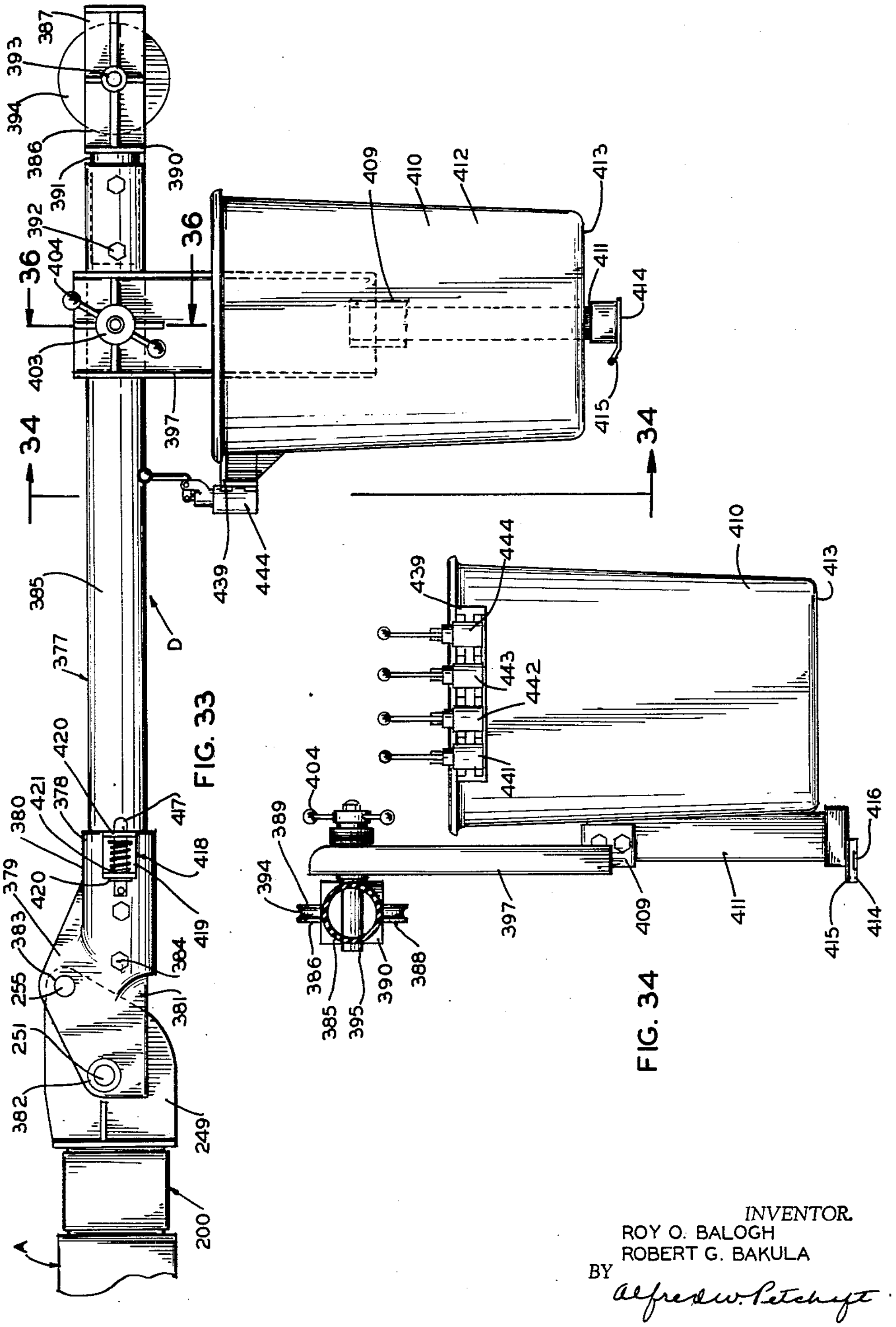
Figure 36:
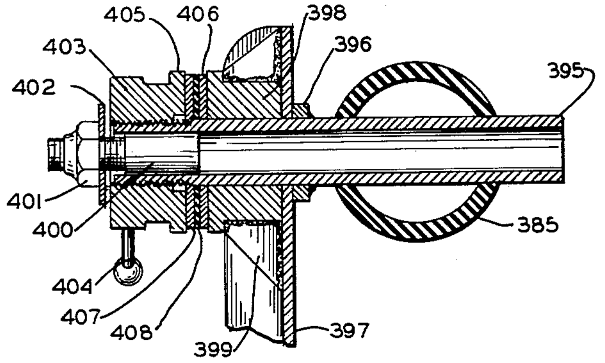
Figure 35:
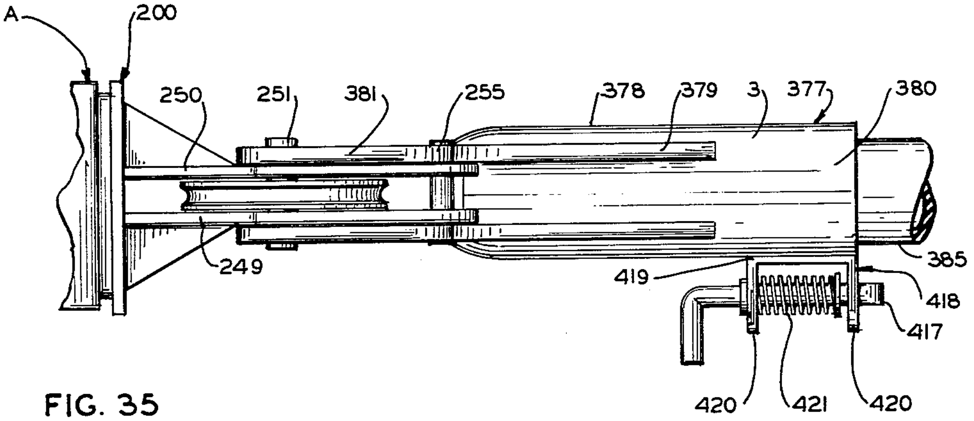
Figure 37:
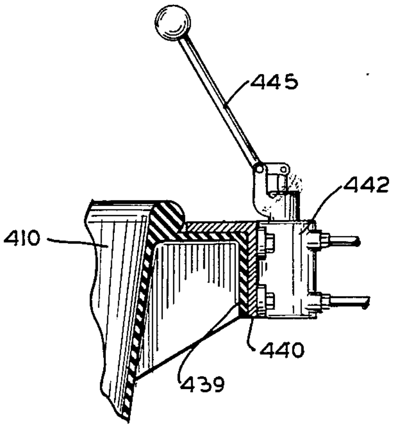
Figure 38:
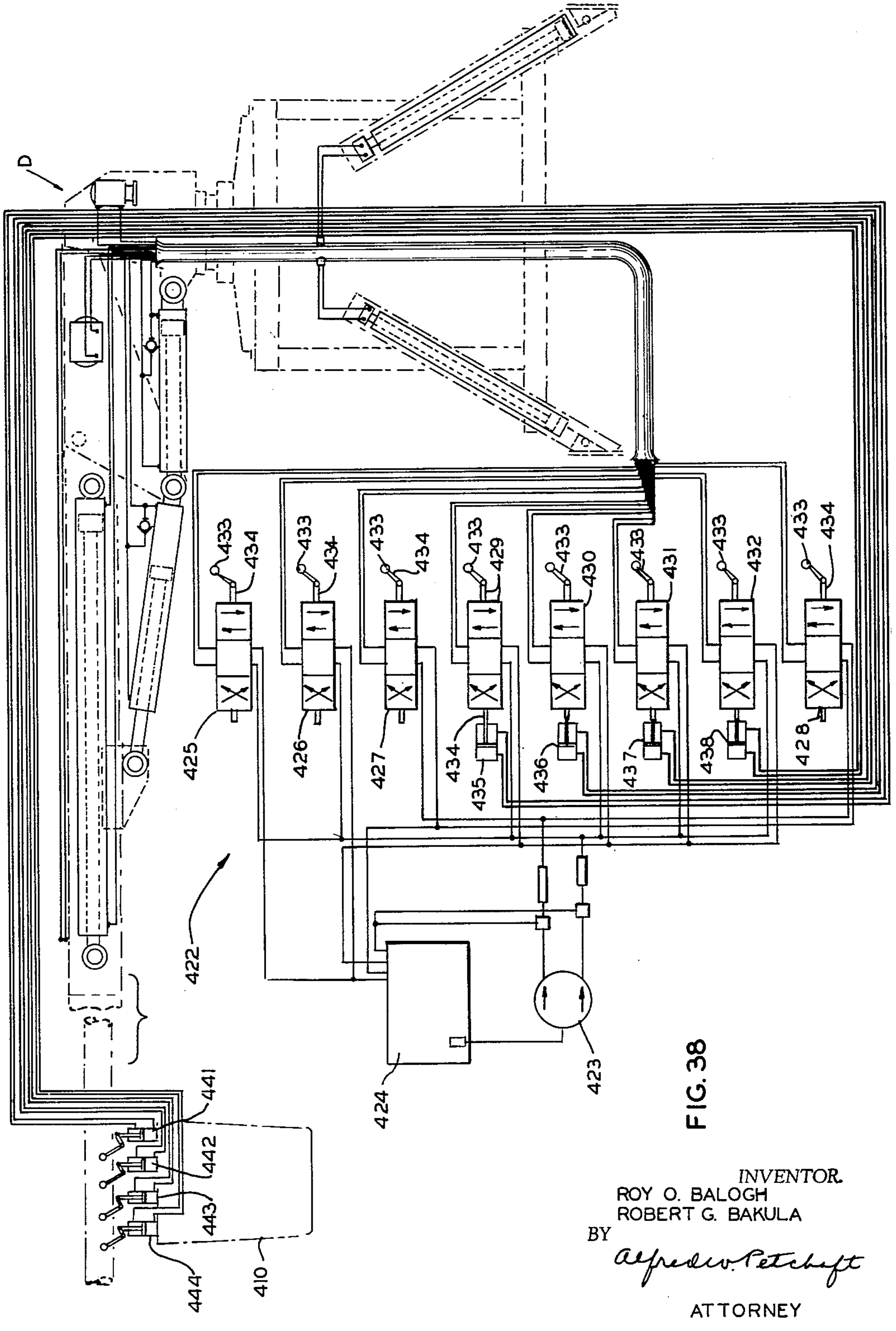

FIGS. 5 and 6 are fragmentary sectional views taken along lines 5—5 and 6—6, respectively, of FIG. 4;

FIG. 7 is a sectional view taken along line 7—7 of FIG. 5;

FIGS. 8 and 9 are fragmentary sectional views taken along lines 8—8 and 9—9, respectively, of FIG. 4;

FIG. 10 is a fragmentary sectional view taken along line 10—10 of FIG. 2;

FIG. 11 is a fragmentary sectional view taken along line 11—11 of FIG. 10;

FIG. 12 is a fragmentary sectional view taken along line 12—12 of FIG. 11;

FIGS. 13 and 14 are sectional views taken along lines 13—13 and 14—14, respectively, of FIG. 1;

FIG. 15 is a fragmentary sectional view along line 15—15 of FIG. 2;

FIG. 16 is a fragmentary sectional view taken along line 16—16 of FIG. 15;

FIG. 17 is a fragmentary sectional view taken along line 17—17 of FIG. 16;

FIGS. 18 and 19 are sectional views taken along lines 18—18 and 19—19, respectively, of FIG. 1;

FIG. 20 is a fragmentary sectional view taken along line 20—20 of FIG. 19;

FIGS. 21 and 22 are fragmentary sectional views taken along lines 21—21 and 22—22 of FIG. 20;

FIG. 23 is a fragmentary sectional view taken along line 23—23 of FIG. 2;

FIG. 24 is a schematic view of the control system and hydraulic circuitry forming part of the single boom derrick unit A;

FIG. 25 is a side elevational view of the modified form of single boom derrick unit constructed in accordance with and embodying the present invention;

FIG. 26 is a top plan view of the derrick unit of FIG. 25;

FIG. 27 is a fragmentary sectional view taken along line 27—27 of FIG. 26;

FIG. 28 is a sectional view taken along line 28—28 of FIG. 25;

FIG. 29 is a fragmentary side elevational view of another modified form of single boom derrick unit constructed in accordance with and embodying the present invention;

FIG. 30 is a top plan view of the derrick unit of FIG. 29;

FIG. 31 is a fragmentary sectional view taken along line 31—31 of FIG. 30;

FIG. 32 is a fragmentary sectional view taken along line 32—32 of FIG. 31;

FIG. 33 is a fragmentary side elevational view of a further modified form of single boom derrick unit constructed in accordance with and embodying the present invention;

FIG. 34 is a vertical sectional view taken along line 34—34 of FIG. 33;

FIG. 35 is a top plan view, partly broken away, of the derrick unit of FIG. 33;

FIG. 36 is a sectional view taken along line 36—36 of FIG. 33;

FIG. 37 is a sectional view of a portion of the control system of the derrick unit of FIG. 33; and FIG. 38 is a schematic view of the control system and hydraulic circuitry forming part of the derrick unit of FIG. 33.

Figure 3:
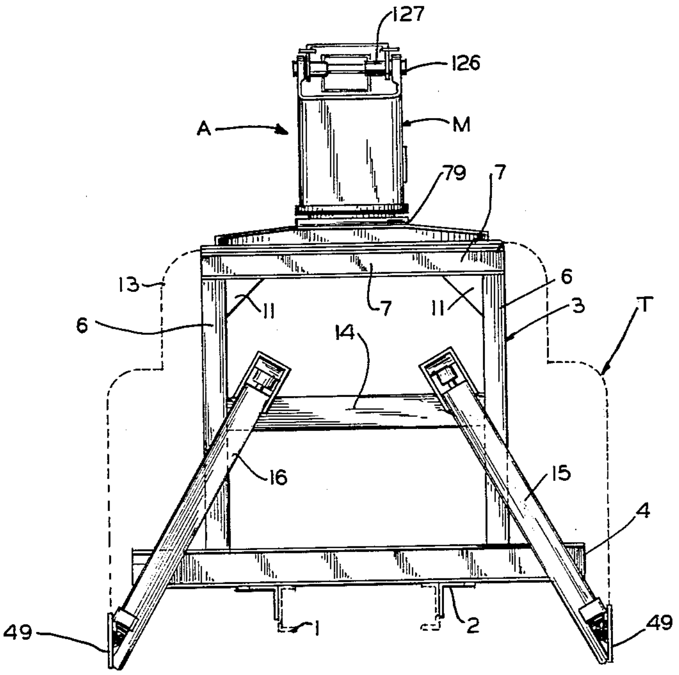
FIG. 3 is a left end elevational view of the rotatable derrick.

Referring now in more detail and by reference characters to the drawings, which illustrate practical embodiments of the present invention, A designates a single boom derrick unit which is suitably mounted on a conventional truck T, the latter being shown in dotted lines in FIG. 1. The truck T is generally provided with a pair of lengthwise extending frame members 1 and welded to the exterior vertical walls thereof are support channels 2 and welded to the upper faces thereof is a derrick support frame 3, the latter including a pair of spaced transversely extending cross-bars 4, 5, and welded to the transverse ends thereof are four uprights 6. Welded to the upper ends of each of the two forward uprights 6 and extending transversely thereacross is an upper cross-bar 7 and welded to the upper ends of each of the two rearward uprights 6 and extending transversely thereacross is an upper cross-bar 8. Interconnecting each of the cross-bars 7, 8, at their transverse margins is a pair of lengthwise extending support members 9, 10, which are, in turn, supported by gusset plates 11, the latter being welded to the underside of the support members 9, 10, and to the uprights 6. The pair of rearward uprights 6 can further be supported by a pair of rearwardly and downwardly extending braces 12 which are bolted or otherwise secured at their lower ends to the frame members 1 forming part of the truck T. The cross-bars 4, 5, 7, and 8, and the uprights 6 are preferably formed from any standard H-shaped rolled steel. As shown in FIGS. 1 and 3, the support frame 3 can be suitably enclosed within a truck body 13 forming part of the truck T.

Welded to and extending transversely between each of the forward uprights 6, somewhat centrally of their upper and lower ends, is a U-shaped intermediate cross-bar 14 and welded to the cross-bar 14 and each of the forward uprights 6 is a pair of outwardly and downwardly diverging outriggers 15, 16, both of which are substantially identical and, therefore, only the outrigger 15 will be illustrated and described in detail herein.

The outrigger 15 comprises a movable hydraulic cylinder 17 which is internally bored to accommodate a stationary tubular piston rod 18 and welded or otherwise rigidly secured to the lower end of the piston rod 18 is a cylindrical plug 19 having an axial fluid duct 20. The plug 19 is turned down at its lower end to form a diametrally reduced portion 21 and an annular shoulder 22. Mounted on the diametrally reduced portion 21 is a cylindrical piston 23 which is interposed between a pair of retaining plates 24, 25, the former of which abuts the annular shoulder 22 and is retained in a locked position by means of a nut 26. The retaining plates 24, 25, are annularly grooved to accommodate annular neoprene rubber sealing rings 27, 28, which form a tight wiping seal against the wall of the cylinder 17. Welded to the lower end of the hydraulic cylinder 17 is a backing plate 29 which is spaced from the retaining plate 25 forming a fluid chamber 30. Disposed within and extending axially through the tubular piston rod 18 is a fluid supply line 31 which is secured at its lower end to the plug 19 and communicates with the chamber 30 through the fluid duct 20. The supply line 31 is spaced from the inner annular wall of the piston rod 18 forming an annular fluid channel 32. The upper end of the tubular piston rod 18 is welded to the underside of a valve block 33 which is integrally provided with an upstanding reduced head 34, the head 34 being fitted within the bore of a retaining block 35 and removably secured thereto by means of a removable pin 36. The retaining block 35 is bolted to a U-shaped link 37 which extends along a portion of the exterior surface of, and is welded to, an outrigger housing 38 which is, in turn, welded to one of the forward uprights 6 and the cross-bar 14.

Rigidly secured to the upper end of the movable hydraulic cylinder 17 is a cylinder head 39 which is annularly grooved to accommodate a pressure seal 40 and a wiping seal 41, both of which engage the exterior surface of the stationary piston rod 18 as the cylinder 17 moves therelong. The cylinder head 39 is grooved to accommodate compression springs 42 for urging each of the seals 40, 41, into engagement with the exterior annular surface of the piston rod 18, thereby forming a wiping seal contact. The cylinder head 39 is integrally formed with a depending annular bumper flange 43 which serves as a limiting means for the extension of the hydraulic cylinder 17 when the bumper flange 43 abuts the upwardly presented surface of the retaining plate 24.

When the outriggers 15, 16, are in an extended position, a rather severe strain would be imposed upon the hydraulic cylinder 17, and cause a serious lateral deflection or buckling. In order to prevent this rather severe stress upon the hydraulic cylinder 17, an outer support sleeve 44 is concentrically spaced from and secured to the hydraulic cylinder 17 by means of a pair of spacer rings 45, 45'. By reference to FIG. 4, it can be seen that the piston rod 18 is also concentrically spaced from the internal wall of the cylinder 17, thereby forming an annular fluid chamber 46 which communicates with the fluid channel 32 through apertures *o* formed in the lower end of the piston rod 18. The support sleeve 44 is axially disposed within the outrigger housing 38 and is sized for slidably engaging the internal wall of the housing 38 when the cylinder 17 is extended. The backing plate 29 is integrally formed with a depending boss 47 and pivotally secured thereto by means of a pin 48 is an outrigger base 49 having an upstanding clevis 50 and a flat undersurface 51 which is adapted to contact the ground when the outrigger 15 is in the extended position, that is the position as shown in the dotted lines of FIG. 4. The outrigger housing 38 is integrally formed with a depending tongue 52 having a lower arcuate edge 53 and when the hydraulic cylinder 17 is in the retracted position, the upper surface of the outrigger base 49 is adapted to contact the arcuate edge 53 and will pivot to the position as shown in the solid lines of FIG. 4. By means of this construction, it can be seen that when fluid is pumped through the fluid supply line 31 and into the chamber 30, the fluid under pressure will bear against the backing plate 29 which will cause the movable hydraulic cylinder 17 to extend with respect to the stationary piston rod 18. As this occurs, the weight of the outrigger base 49 will cause the same to pivot to the position as shown in the dotted lines of FIG. 4. When it is desired to retract the outrigger 15 to the position as shown in the solid lines of FIG. 4, fluid is pumped through the annular fluid channel 32 and out through the set of apertures *o* and into the annular fluid chamber 46. This fluid under pressure will bear against the undersurface of the cylinder head 39, causing the cylinder 17 to retract within the outrigger housing 38.

In order to prevent the collapsing of the outriggers 15, 16, in the event that any of the hydraulic fluid lines should break, the outriggers 15, 16, are provided with a fluid safety lock system which is mounted within the valve block 33 and can best be seen in FIGS. 5–7. Mounted within the valve block 33 is a pair of fluid couplings 55, 56, and formed in the valve block 33 is a pair of radial passageways 57, 58, each of which is plugged at both ends by fluid plugs 59, 59', and 60, 60'. Disposed within the radial passageway 57 is a ball check 61 which is normally biased into engagement with a valve seat 62 formed within the radial passageway 57, by means of a compression spring 63 which bears against a pin 64, the latter, in turn, bearing against the ball check 61, all as best seen in FIG. 5. Also operatively disposed within the radial passageway 57 is a piston 65 having a plunger element 66 which is adapted to bear against the ball check 61 for urging the same away from its seated position against the valve seat 62. Similarly disposed within the radial passageway 58 is a ball check 67 which is normally biased into engagement with a valve seat 68 formed within the radial passageway 58 by means of a compression spring 69 which is interposed between the plug and a pin 70, the latter bearing against the ball check 67. Also disposed within the radial passageway 58 is a piston 71 which is provided with an axially extending plunger 72, the latter being adapted to bear against the ball check 67 for urging the same away from its seated position against the valve seat 68. A fluid duct 73 connects the fluid coupling 55 with the radial passageway 57 and through an auxiliary duct 74 with the fluid supply line 31. At the same time fluid will pass through a bypass duct 75 into the radial passageway 58 thereby forcing the piston 71 inwardly within the passageway 58 causing the plunger element 72 to force the ball check 67 away from the valve seat 68. In like manner, fluid can be supplied from the fluid coupling 56 to the fluid channel 32 through a fluid duct 76 into the radial passageway 58 and through an auxiliary duct 77 into the fluid channel 32. A bypass duct 78 also connects the fluid coupling 56 to the radial passageway 57 for biasing the ball check 61 away from the valve seat 62.

Thus, if it is desired to extend the hydraulic cylinder 17 of the outrigger 15, fluid is pumped into the coupling 55, through the fluid duct 73, forcing the ball check 61 away from the valve seat 62 where the fluid will then pass through the auxiliary duct 74 and into the fluid supply line 31. As the fluid chamber 30 is filled with fluid, the movable hydraulic cylinder 17 will extend in the manner as previously described. At the same time, fluid will pass through the bypass duct 75 into the radial passageway 58, causing the piston 71 and plunger 72 to bias the ball check 67 away from the valve seat 68. This will, in turn, permit fluid within the fluid chamber 46 and the fluid channel 32 to pass through the auxiliary duct 77, through the radial passageway 58, out through the fluid duct 76 and the coupling 56. In this connection, it is to be noted that when the outrigger 15 reaches its fully extended position, fluid under pressure will no longer be supplied to the fluid couplings 55, 56, and both of the ball checks 61, 67, will be seated against the valve seats 62, 68, respectively, causing the outrigger 15 to be maintained in a rigid extended position. When it is desired to retract the cylinder 17 in the outrigger housing 38, fluid is supplied to the fluid coupling 56 through the fluid duct 76 forcing the ball check away from the valve seat 68, past the valve seat 68, through the auxiliary duct 77 and into the fluid channel 32. This will cause the hydraulic cylinder 17 to retract to the position as shown in the solid lines of FIG. 4 in the manner as previously described. At the same time that fluid is supplied to the channel 32 and hence chamber 46, fluid will pass from the coupling 56 through the bypass duct 78 and into the radial passageway 57, causing the piston 65 and plunger 66 to urge the ball check 61 away from the valve seat 62, against the action of the compression spring 63. This will permit the fluid within the fluid supply line 31 to pass through the auxiliary duct 74, through the radial passageway 57, and out through the fluid duct 73 and coupling 55. It is to be noted in this connection that after the cylinder 17 has reached its fully retracted position, there will be no fluid pressure maintained at either of the fluid couplings 55, 56, thereby permitting each of the ball checks 61, 67, to be biased into engagement with the valve seats 62, 68, respectively. By means of the above-outlined construction, it can be seen that the outrigger 15 will always maintain its rigid position after the fluid under pressure is cut off from either of the couplings 55, 56. Thus, if one of the fluid lines within the hydraulic system, to be hereinafter described, should break, the outrigger 15 would not collapse, because each of the ball checks 61, 67, is biased against the valve seats 62, 68, respectively, thereby closing each of the chambers 30, 46, to the fluid source. As the outrigger 16 is substantially identical to the outrigger 15 and operates in like manner, it is neither illustrated nor described in detail herein.

Rigidly secured to the upper end of the lengthwise extending supports 9, 10, is a horizontal plate 79 which is formed with a shallow recess 80 for accommodating a derrick mast assembly M which includes an upstanding mast support 81 secured to the plate 79 by means of bolts 82. The mast support 81 is hollow and communicates with an aperture 83 formed in the horizontal plate 79 for accommodating an auxiliary winch-cable, the latter not being shown, and which may be used with the derrick A. The mast support 81 is formed with an enlarged base portion 84 forming an annular shoulder 85 for supporting a circular worm gear 86 which is rigidly secured to the mast support 81 by means of bolts 87. The enlarged base portion 84 is integrally formed with an outwardly extending annular flange 88 for supporting an L-shaped bearing 89 which is retained by means of a bearing ring 90 which is secured to the flange 88. Bolted to the bearing ring 90 by means of bolts 91 is a mast housing 92 which is rotatable with respect to the mast support 81. The mast housing 92 is integrally formed with an inwardly extending intermediate support plate 93 having an upstanding annular flange 94 which bears against an L-shaped bearing 95, the latter being retained by means of a bearing cap 96 which is secured to the mast support 81 by means of bolts 97. By means of this construction, it is obvious that the L-shaped bearings 89, 95, act as radial and thrust bearings and support the mast housing 92 in a rotatable position on the mast support 81. The mast housing 92 is provided with a grease fitting 98 for supplying grease or other lubricant to each of the L-shaped bearings 89, 95, and the flange 88 is annularly grooved to accommodate a neoprene rubber annular seal 99 for forming a sealing contact between the bearing ring 90 and the mast support 81.

The intermediate support plate 93 is suitably apertured internally of the mast housing 92 to accommodate a motor support 100 having an annular flange 101 for supporting a hydraulic motor 102 including a drive shaft 103 which is conventional, and, therefore, is neither illustrated nor described in detail herein. Rigidly connected to the drive shaft 103 by means of a suitable coupling 104 is a rotatable shaft 105 having a diametrally reduced lower end 106 forming an annular shoulder 107, which is supported by suitable ball bearings 108, the latter being retained by a bearing shoulder plate 109 secured to the housing 92. Secured to the shaft 105 and rotatable therewith is a worm 110 which meshes with a worm gear 111 which is, in turn, keyed to a stub shaft 112. The stub shaft 112 is journaled in bearings 113 which are mounted within the wall of the mast housing 92 and in bearings 114 which are mounted within an upstanding intermediate wall 115 formed with the mast housing 92.

Integrally formed with the stub shaft 112 is a rather small diameter spur gear 116 which meshes with a rather large diameter pinion gear 117, which is, in turn, mounted upon a shaft 118, the latter being located in downwardly spaced relation to the stub shaft 112 and being journaled in an annular bearing ring 119 secured to the intermediate wall 115. The shaft 118 is journaled at its other end in a set of tapered roller bearings 120 which are secured between an inner race 121 and an outer race 122 and which are retained by means of a set of locking nuts 123. Integrally formed with the shaft 118 and rotatable therewith is a worm 124 which is adapted to mesh with the worm gear 86. Thus, it can be seen that through the gear reduction system, the hydraulic motor 102 will rotate the mast housing 92 with respect to the mast support 81. Thus, when the hydraulic motor 102 is actuated by a suitable control system to be hereinafter described, the shaft 105 will rotate the worm 110 which will, in turn, rotate the worm gear 111. As the worm gear 111 rotates the stub shaft 112, the spur gear 116 will mesh with the pinion gear 117 and rotate the shaft 118 at a reduced rate. The worm 124 on the shaft 118 which meshes with the worm gear 86 will cause the housing 92 to rotate with respect to the mast support 81, all as best seen in FIGS. 10–12.

The mast housing 92 is integrally formed with a pair of upstanding ears 125 and extending therebetween is a pin or pintle 126 which is journaled in bearing sleeves 127, the latter being secured to the upstanding ears 125, all as best seen in FIG. 13. Pivotally mounted on the pin 126 is a link 128 which consists of a pair of spaced parallel triangular shaped plates 129, 130, each of which is integrally formed with a pair of converging connecting portions 131, 132, at their lower ends and which, in turn, merge into depending legs 133, 134, respectively. The parallel plates 129, 130, are also formed with upwardly converging connecting portions 135, 136, which integrally merge into upstanding arms 137, 138, respectively. Extending between and connecting each of the vertical triangular plates 129, 130 is a pair of cross-connecting gussets 139, 140, and integrally formed with the upper end of each of the plates 129, 130, is a pair of annular horizontal support flanges 141, 142, respectively. Mounted within each of the upstanding arms 137, 138, are coaxially aligned bearing sleeves 143, 144, which are, in turn, mounted upon the pin 126 for pivotally securing the link 128 thereto, all as best seen in FIG. 13.

Integrally formed with the mast housing 92 is a pair of rearwardly projecting ears 145, 146. Mounted in and extending between the ears 145, 146, is a pivot pin 147 for rockably supporting a double-acting hydraulic cylinder 148 which terminates in an enlarged mounting boss 149, the latter being suitably apertured for mounting on the pivot pin 147. The pivot pin 147 is integrally provided with an enlarged head 150 which bears against the ear 145 and at its other end is provided with a washer 151 and a locking ring 152 for retention within the projecting ears 145, 146. Operatively mounted within the cylinder 148 is a piston rod 153 which terminates in an enlarged mounting boss 154 and is pivotally secured to the lower end of the link 128 by means of a pin 155 which is mounted in and extends between the depending legs 133, 134. The pin 155 is retained in any conventional manner as is the pin 147 by means of an enlarged head 156 integrally formed on one end and secured to the other end thereof is a washer 157 and locking ring 158.

Extending between each of the vertical triangularly shaped plates 129, 130, intermediate their forward and rearward ends, is a pair of spaced L-shaped cross-bars 159, 160, and welded to each of the transverse ends thereof are mounting blocks 161, 162, respectively, which are, in turn, welded to the vertical plates 129 and 130. Welded to and extending between each of the cross-bars 159, 160, is a pair of spaced support brackets 163, 164, for supporting a cable winch 165 which is mounted on a shaft 166, the shaft 166 being, in turn, journaled in the support brackets 163, 164. Mounted on one extended end of the shaft 166 is a worm gear 167 which meshes with a worm 168 which is mounted on the drive shaft 169 of a reversible hydraulic motor 170. The other end of the drive shaft 169 is suitably journaled in the vertical flange of the cross-bar 160 and the motor 170 is mounted on the underside of the cross-bar 159. The hydraulic motor 170 is conventional and, therefore, neither illustrated nor described in detail herein, and is operated by a suitable control system to be hereinafter described. The cable winch 165 is provided with a cable 171 of the type normally used in winches. By reason of the gear reduction between the worm gear 167 and the worm 168, it can be seen that the cable winch 165 will not turn unauthorizedly when a heavy load is connected to the cable 171.

Extending between the triangular plates 129, 130, is a pivot pin 172 which is journaled in a pair of bearing sleeves 173, 174, each of which is mounted in the upstanding arms 137, 138, respectively. The pin 172 is substantially identical to the previously described pin 126 and is retained in the arms 137, 138, in like manner. Pivotally mounted on the pin 172 is a main boom 175 which has a pair of integrally formed rearwardly extending ears 176, 177, each of which is provided with bearing sleeves 178, 179, respectively, and which are mounted on the pin 172 for pivotally supporting the boom 175. The boom 175 is rectangular in cross-section and is formed with a pair of rolled steel U-shaped channels 180, 181, and welded to the upper and lower surfaces thereof is a pair of support plates 182, 183, thereby forming a tubular bore 184. Welded to each of the U-shaped channels 180, 181, and extending laterally outwardly therefrom is a set of U-shaped channel members 185, 186, having vertical walls 187, 188, which are spaced from the vertical walls of the channels 180, 181, respectively, thereby defining a pair of elongated compartments 189, 190.

The boom 175 can be pivoted with respect to the link 128 by means of a double-acting hydraulic cylinder 191 having an integrally formed clevis 192 at one end which is mounted upon the pin 155. Operatively mounted within the hydraulic cylinder 191 are a piston 193 and piston rod 194, the latter of which terminates in an enlarged mounting boss 195 for accommodating a pivot pin 196. A U-shaped bracket 197 is welded to the underside of the boom 175 and is provided with a depending clevis 198 for accommodating the pin 196, the clevis 198 further being reinforced by means of a gusset 199. By means of this construction, it can be seen that when the hydraulic cylinder 191 is actuated by a suitable control system which will be hereinafter described, the boom 175 will pivot with respect to the link 128. The link 128 can, of course, pivot with respect to the mast housing 92 and carry therewith the boom 175. Additionally, the mast housing 92 can rotate and swing the boom 175 and link 128 to any position within an arc of 360° with respect to the truck T such as to a position as shown in FIG. 24.

Disposed within the tubular bore 184 of the boom 175 and being adapted for extensible movement therein is an auxiliary boom or stinger 200, which is operable by a double-acting hydraulic cylinder 201. The cylinder 201 is integrally provided with an enlarged mounting boss 202 at its forward end which is, in turn, rockably mounted on a pivot pin 203, the latter of which is journaled in bearing sleeves 204, 205, and which are, in turn, mounted within the vertical walls 187, 188, and the channels 180, 181. The construction of the auxiliary boom or stinger 200 is similar to the construction of the previously described boom 175 and consists of a pair of spaced opposed U-shaped channel members 206, 207, and welded to the upper and lower ends thereof are connecting plates 208, 209, thereby forming a tubular bore 210 of rectangular cross-section. Interconnecting the bight portions of each of the channel members 206, 207, is a transversely extending rectangular support plate 211. The double-acting hydraulic cylinder 201 is disposed within and extends axially through the tubular bore 210 and operatively mounted within the cylinder 201 is a piston 212 having an extended piston rod 213. Integrally formed on the rearward end of the piston rod 213 is an enlarged mounting boss 214 which is pivotally mounted on a pivot pin 215, the pivot pin 215 being, in turn, disposed within bearing collars 216, 217, which are, in turn, mounted within the vertical walls of the channel members 206, 207. The bearing collars 216, 217, are further reinforced by a pair of vertical support plates 218, 219, which extend between and are welded to the upper and lower walls of the auxiliary boom 200. Thus, it can be seen that when the piston rod 213 is extended, it will extend the auxiliary boom 200 outwardly of the free end of the main boom 175.

Since a great deal of the weight which will be connected to the cable 171 will be imposed upon the auxiliary boom 200, the vertical walls of the channel members 206, 207, are provided with rectangular rub plates 220, 221, each of which is provided with relatively flat bearing surfaces 222, 223, and which bear against the interior surface of the channels 180, 181, forming part of the main boom 175. Welded to the lower plate 209 of the auxiliary boom 200 is a rub plate 224 having a downwardly presented bearing surface 225, which bears against the inwardly presented bottom surface of the main boom 175 during the sliding movement of the auxiliary boom 200. Welded to the interior surfaces of the vertical walls of the channels 206, 207, are inwardly extending support brackets 226 having upstanding flanges 227 for journaling a roller pin 228, and mounted on the pin 228 is a relatively hard steel roller 229. By reference to FIG. 16, it can be seen that when the auxiliary boom 200 is in the retracted position within the main boom 175, that is the position as shown in FIG. 1, the roller 229 is slightly spaced from the inner surface of the top wall forming part of the main boom 175. When the auxiliary boom 200 is extending outwardly of the main boom 175, the rub plate 224 will bear against the bottom wall of the main boom 175, and rub plates 220, 221, will bear against the side walls of the channels 180, 181. However, when the load and the weight of the auxiliary boom 200 which is exterior to the main boom 175 becomes greater than the weight of the auxiliary boom 200 still housed within the main boom 175, the outer end of the auxiliary boom 200 will shift slightly downwardly causing the roller 229 to contact the top wall of the main boom 175 and thereby support the auxiliary boom 200 during the remainder of its sliding movement within the main boom 175.

By reference to FIG. 19, it can be seen that a pair of vertical rub plates 230, 231, are welded to the interior surface of the channels 180, 181, adjacent their rearward margins, each of the plates 230, 231, being provided with bearing surfaces 232, 233, respectively, which bear against the exterior surface of the vertical walls forming part of the boom 175. The rub plates 230, 231, are so located that they bear against the upper portions of the auxiliary boom 200 during its shiftable movement within the main boom 175. The underside of the main boom 175 is provided with a transversely extending aperture 234 and welded to the base of the boom 175 on each side of the aperture 234 are support brackets 235, 236. Welded to each of the ends of the support brackets 235, 236, are vertical support plates 237, 238, for journaling a roller pin 239 and mounted on the pin 239 is a relatively hard steel roller 240 which is sized to project through the aperture 234 and engage the underside of the auxiliary boom 200. Welded to the interior faces of the support plates 237, 238, are bearing collars 241, 242, respectively, which bear against the roller 240. The support plates 237, 238, moreover, extend upwardly within the main boom 175 for some distance and are provided with bearing surfaces 243, 244, which are adapted to bear against the exterior vertical walls forming part of the auxiliary boom 200. Thus, it can be seen that the auxiliary boom 200 is supported at the rearward end of the main boom 175 during its extensible movement by the roller 240. Moreover, the shifting and the straight line movement of the auxiliary boom 200 within the main boom 175 is insured by the rub plates 230, 231, and the vertical support plates 237, 238.

By reference to FIG. 20, it can be seen that the outer channel members 185, 186, of the main boom 175 terminate rearwardly of the channels 180, 181, thereby providing access to the elongated compartments 189, 190. This will provide access to the various hydraulic lines which are carried within the compartments 189, 190, and will enable these lines to be connected to the various auxiliary devices which may be attached to the outer end of the auxiliary boom 200. By further reference to FIG. 20, it can be seen that the auxiliary boom 200 extends rearwardly of the channels 180, 181, for a slight distance, and inserted into the open end of the tubular bore 210 and welded to the vertical walls of the boom 200 is a U-shaped retaining member 245 forming part of a sheave block assembly 246. It is to be noted that the vertical walls of the auxiliary boom 200 are provided with a series of apertures 247 which enable the retaining member 245 to be spot welded to the channel members 206, 207. The sheave block assembly 246 consists of a vertical plate 248 which is welded to the U-shaped retaining member 245 and welded to the rearwardly presented surface of the plate 248 is a pair of sheave plates 249, 250, which support a removable pin or pintle 251 and mounted thereon is a sheave or pulley 252. A pair of horizontal gusset plates 253, 254, is welded to the sheave plates 249, 250, and the vertical plate 248, for reinforcement. It is to be noted that the lower ends of the sheave plates 249, 250, are beveled and outwardly curved to provide smooth edges in order to prevent any undue wear on the cable 171, which is trained around the sheave or pulley 252. A cable retaining pin 255 extends between and is removably secured to each of the sheave plates 249, 250, to retain the cable 171 in the event that it should snap and swing upwardly. Welded to the upper surface of the main boom 175 is a guide plate 256 having a pair of upstanding flanges 257 forming a guide slot 257'. Welded to the upper surface of the auxiliary boom 200 is an upstanding forwardly projecting guide finger 258 having a lower beveled edge 258' which engages the guide slot 257' when the auxiliary boom 200 is in its retracted position thereby taking the weight of the auxiliary boom 200 off of the roller 240. In order to regulate the retracting movement of the auxiliary boom 200, a U-shaped retaining plate 259 is disposed over and welded to the outer end of the auxiliary boom 200 adjacent the vertical plate 248 and which is adapted to abut the rearward ends of the channels 180, 181, substantially as shown in FIG. 20. Furthermore, a stop plate 260 is welded to the underside of the auxiliary boom 200 and serves the same purpose. The stop plate 260 can preferably be provided with a depending mounting bracket 260' for accommodating any accessory equipment, the latter not being shown.

The single boom derrick unit A is suitably provided with a control system 261 conveniently mounted on the derrick support frame 3 for easy access thereto, and comprises a fluid pump motor combination 262 which is connected to a reservoir 263 as schematically shown in FIG. 24. The outriggers 15, 16, are operated through a pair of two-way three-position control valves 264, 265, respectively, and which are connected to the fluid couplings 55, 56, of the outriggers 15, 16, through pairs of hydraulic lines 266, 267, respectively. The hydraulic motor 170 for operating the cable winch 165 is controlled through a two-way three-position winch control valve 268 and which is connected to the hydraulic motor 170 through a pair of hydraulic lines 269.

It is often desirable to attach accessory or auxiliary equipment, such as hole diggers or pole drivers, to the outer end of the main boom 175 or the auxiliary boom 200. Accordingly, the derrick unit A is provided with a pair of accessory hydraulic lines 271 which are hydraulically connected to an auxiliary two-way three-position valve 272. The accessory lines 271 are threaded through the upstanding mast support 81, through the aperture 83, and through the elongated compartments 189, 190, formed within the main boom 175. The accessory lines 271 terminate outwardly of the main boom 175 and are suitably provided with removable plugs 273. It could be understood in this connection that the derrick unit A could be provided with two or more pairs of auxiliary lines, if it were desired to attach more than one accessory device to the outer end thereof.

The hydraulic motor 102, which rotates the mast assembly M, is operated through a two-way three-position hydraulic motor valve 274 which is operatively connected to the hydraulic motor 102 through hydraulic lines 275. Operatively connected across the hydraulic lines 275 is pressure valve 275' for eliminating any excess hydraulic pressure on the hydraulic motor 102. The link 128 is powered for pivotal movement with respect to the mast assembly M through the hydraulic cylinder 148 which is controlled by means of a two-way three-position link control valve 276, the latter being connected to the hydraulic cylinder 148 through hydraulic lines 277. The main boom 175 is pivoted with respect to the link 128 by means of the hydraulic cylinder 191 which is controlled through a two-way three-position main boom control valve 278, the latter being hydraulically connected to the hydraulic cylinder 191 through hydraulic lines 279. The auxiliary boom 200 is powered through the double-acting hydraulic cylinder 201 which is controlled through a two-way three-position auxiliary boom control valve 280, the latter being connected to the double-acting cylinder 201 to hydraulic lines 281. The various control valves and rams are all hydraulically connected as shown schematically in FIG. 24. The various control valves 264, 265, 268, 272, 274, 276, 278, and 280, are conventional and, therefore, neither illustrated nor described in detail herein.

By further reference to FIG. 24, it can be seen that the auxiliary control valve 272 and the winch control valve 268 are connected to the pump motor combination 262 through a high pressure line 282, and connected to a reservoir by a sump line 283. The remainder of the control valves are connected to the pump motor combination 262 through a high pressure line 284 and to the reservoir 263 through a return line 285. This hydraulic system has been found to be the most suitable in that the auxiliary equipment and the power winch are not required to operate at the same hydraulic pressure as is the remainder of the hydraulically operated equipment. A pressure relief valve 286 and a filter 287 is interposed in the high-pressure line 284 and a pressure relief valve 286' and filter 287' is interposed in the high pressure line line 282.

A check vale $c^1$ is connected across the hydraulic cylinder 191 and a check valve $c^2$ is connected across the hydraulic cylinder 148 in the manner as shown in FIG. 24. Thus, it will be seen that the combined weight of the main boom 175 and auxiliary boom 200 will force the piston rods 194, 153, respectively, inwardly within the cylinders 143 and 148. This will considerably reduce the pressure differential between both ports of the cylinders 193, 148, thereby, in effect, bleeding the cylinders 193, 148. This will, of course, somewhat retard the downwardly swinging movement of the boom.

When it is desired to use the derrick unit A, the outriggers 15, 16, are lowered to their extended position where the outrigger bases 48 contact the ground. This is accomplished by actuating the control valves 264, 265, and pumping fluid through the hydraulic lines 266, 267, into the fluid supply lines 31 of each of the outriggers 15, 16. The fluid will then be drawn into the chamber 30 and will bear against the backing plate 29 which will cause the hydraulic cylinder 17 to extend outwardly of the outrigger housing 38. If either of the hydraulic lines 266, 267, should break, or if the outrigger valves 264, 265, should suffer a failure, the outriggers 15, 16, will still be maintained in their extended positions, this is the position as shown in the dotted lines of FIG. 4, by means of the fluid safety lock system previously described.

In order to pivot the main boom 175, the operator standing alongside of the support frame 3, will open the control valve 274, permitting fluid to flow through the hydraulic lines 275, and into the hydraulic motor 102. As the motor 102 is powered, the shaft 105, carrying the worm 110, is rotated, and which will, in turn, rotate the stub shaft 112 through the worm gear 111. As the shaft 112 rotates, the spur gear 116 which is mounted thereon will mesh with the pinion gear 117 and rotate the shaft 118 at a considerably reduced rate but at a greater power factor. As the shaft 118 rotates, the worm 124 which meshes with the worm gear 86, will cause the housing 92 to rotate with respect to the mast support 81. Thus, it can be seen that the entire main boom assembly 175 will rotate on the mast housing 92 with respect to the upstanding mast support 81. It is obvious that the boom 175 can rotate in a horizontal plane in an arc greater than 360°.

Thus, after the boom 175 is rotated in a horizontal plane to the desired position, it can be raised or lowered with the link 128 or with respect to the link 128, as may be desired. As can be seen by reference to FIG. 25, if the main boom 175 is swung to a position where it extends outwardly over the side of the truck T, such as to a position as shown in FIG. 24, it can be seen that the boom 175 can be swung downwardly to a point where the outer end thereof is in close proximity to the ground, as the link 128 is sufficiently large so that the outer end thereof extends over the lateral sides of the truck T. Moreover, the link 128 carrying the main boom 175 may be swung upwardly to a position where it remains at an angle with respect to the horizontal, and the boom 175 then pivoted downwardly until it assumes a horizontal position. By means of this construction, it can be seen that the main boom 175 can assume an almost endless variety of positions with respect to the derrick support 3 and truck T.

When it is desired to either raise or lower the link 128, the control valve 276 is opened, permitting fluid to flow through the hydraulic lines 277, and into the hydraulic cylinder 148. Thus, it can be seen that if the valve 276 is opened in such manner to extend the piston forming part of the cylinder 148, the link 128 will swing upwardly, reference being made to FIG. 1. If the valve 276 is moved to its other end position, the fluid will enter the other port of the cylinder 148 causing the piston forming a part thereof to retract, and thereby swinging the link 128 downwardly. When it is desired to actuate the main boom 175, the control valve 278 is opened permitting fluid to flow through the hydraulic lines 279 and into the cylinder 191. If the valve 278 is opened to extend the piston 193, the boom 175 will swing upwardly with respect to the link 128. Similarly, if the valve 278 is moved to its other end position, thereby retracting the piston 193, the boom 175 will swing downwardly.

If it is desired to actuate the auxiliary boom or stinger 200, the control valve 280 is opened permitting hydraulic fluid to flow through the hydraulic lines 281 and into the hydraulic cylinder 201. If the valve 280 is opened in such manner to extend the piston 212, the auxiliary boom 200 will extend outwardly, and the sheave block assembly 246 will move outwardly with respect to the main boom 175. If, however, the control valve 280 is moved to its other end position, the piston 212 will cause the sheave block assembly 246 to move to its retracted position as shown in FIG. 20. In this connection, it should be understood that the winch 165 is rotatably mounted in such manner that it will rotate and permit the cable 171 to travel with the extending auxiliary boom 200. As the auxiliary boom 200 extends within the bore of the main boom 175, the vertical walls of the rub plates 220, 221, which are secured to the vertical walls of the channel members 206, 207, will bear against the interior surface of the channels 180, 181. Similarly, the rub plate 224, which is secured to the lower plate 209 of the auxiliary boom 200, will bear against the surface of the main boom 175. The auxiliary boom 200 will always be supported by the roller 240. However, when the load and weight of the auxiliary boom 200 exterior to the main boom 175 becomes greater than the weight of the auxiliary boom 200 within the main boom 175, the auxiliary boom 200 will shift slightly downward, causing the roller 229 to contact the top wall of the main boom 175. By means of this construction, it can be seen that the auxiliary boom 200 will be slidably supported by the roller 229 during the remainder of its extending movement.

It is to be noted that the pressure relief valves 286, 286', will open when all of the aforementioned control valves are biased to their "closed" position. This will enable the pump to continually operate and as the pressure builds up in the hydraulic system, the valves 286, 286', will open causing a recycling of hydraulic fluid from the pump 262 to the reservoir 263. It should also be obvious that the pressure to open each of the control valves 286, 286', will have to be substantially greater than the pressure required to move the combined main boom 175 and auxiliary boom 200.

It is possible to provide a modified form of a single boom derrick unit B, as shown in FIGS. 25 to 28, and which is substantially similar to the previously described derrick A, but which does not employ the connecting link 128. The derrick B is suitably mounted on a conventional truck T', the latter being shown in dotted lines in FIG. 25. The truck T' is provided with a pair of lengthwise extending frame members 288 and welded to the exterior vertical walls thereof are support channels 289. Welded to the upper faces of the support channels 289 is a derrick support frame 290 which is substantially identical to the previously described derrick support frame 3. Also extending between and welded to the upper faces of the support channels 289 is a transversely extending support plate 291 and welded or otherwise rigidly secured to the upper face of the support plate 291 is a cable winch 292 having trained therearound a cable 293. The winch 292 is powered by a suitable reversible hydraulic motor 294 which is also mounted on the transversely extending support plate 291. Inasmuch as the winch 292 and the hydraulic motor 294 are conventional they are neither illustrated nor described in detail herein. The conventional hydraulic motor 294 is preferably constructed with a built-in gear reduction system. The derrick unit B is also provided with a set of outriggers 295 which are substantially identical to the previously described outriggers 15, 16.

Rigidly secured to the upper end of the derrick support frame 290 is a horizontal plate 296 for supporting a derrick mast assembly M' which is substantially similar to the previously described mast assembly M, and includes an upstanding mast support 297. The mast support 297 and the horizontal plate 296 are suitably bored to retain a protective sleeve 298 which accommodates the cable 293, in the manner as shown in FIG. 25. Rotatably mounted on the mast support 297 is a mast housing 299 which is supported and powered in the manner previously described in connection with the derrick unit A and which includes an intermediate horizontal support flange 300. The mast housing 299 is integrally formed with a pair of upstanding ears 301 and extending therebetween is a pin or pintle 302 which is journaled in bearing sleeves 303, the latter being secured to the upstanding ears 301. Also mounted on the pin 302 is a pulley 304 and trained therearound is the cable 293. The cable 293 is supported in the mast housing 299 by means of an idler pulley 305 which is mounted on a bracket 306, the latter being, in turn, rigidly secured to the support flange 300 and the vertical wall of the housing 299. Also mounted on the bracket 306 is a transversely extending retainer pin 307 which will prevent the cable 293 from swinging upwardly in the event that it should snap.

Pivotally mounted on the pin 302 is a main boom 307 having a clevised end 308, and which is substantially identical to the previously described boom 175. The main boom 307 similarly is formed with a rectangular cross-section and consists of a pair of rolled steel U-shaped channels 309 and welded to the upper and lower surfaces thereof is a pair of support plates 310, thereby forming a tubular bore 311. Welded to each of the channels 309 and extending laterally outwardly therefrom, is a set of U-shaped channels 312, having vertical walls which are spaced from the vertical walls of the channels 309, thereby defining a pair of elongated compartments 313 for retaining hydraulic fluid lines, the latter not being shown. Disposed within the tubular bore 311 and being adapted for extensible movement therein is an auxiliary boom or stinger 314 which is substantially identical to the previously described auxiliary boom or stinger 200. Similarly, the auxiliary boom 314 comprises a pair of opposed U-shaped channels 315, which are connected at their upper and lower ends by support plates 316, respectively. The auxiliary boom 314 is powered by means of a double-acting hydraulic cylinder 317 which is identical to the previously described hydraulic cylinder 201 and includes a piston 318 and a piston rod 319. Extending between the vertical walls of the auxiliary boom 314 is a pin 320 which is journaled in bearings 321, the latter, in turn, being mounted in the vertical walls of the auxiliary boom 314 for accommodating an enlarged end 322 of the piston rod 319. The other end of the cylinder 317 is provided with an enlarged mounting boss 323 which is secured to a pin 324, the latter being mounted in the vertical walls of the main boom 307.

The mast housing 299 is integrally formed with a pair of rearwardly projecting ears 325 for retaining a double-acting hydraulic cylinder 326 having an enlarged mounting boss 327 at its forward end. Operatively mounted within the double-acting hydraulic cylinder 326 is a piston 328 having a piston rod 329, the latter being formed with an enlarged mounting boss 330 at its rearward end. Welded to the underside of the main boom 307 is a U-shaped bracket 331 having a pair of depending ears 332, 333, for journaling a pin 334, the latter being adapted to retain the enlarged mounting boss 330 and piston rod 329. By means of this construction, it can be seen that the hydraulic cylinder 326 will pivot the main boom 307 in an arc above the mast assembly M' and the hydraulic cylinder 317 will extend the auxiliary boom 314 when operated by a suitable control system to be hereinafter described.

The single boom derrick unit B is operated by a control system which is substantially identical to the previously described control system 261, and is also mounted on the derrick support frame 3. However, as the derrick unit B does not include the line 128 and, therefore, the hydraulic ram 148, the control system for the derrick unit B does not employ the two-way three-position valve 276 and the accompanying hydraulic lines 277. Otherwise, the control system for the derrick unit B is substantially as shown in FIG. 24, and is also operated in like manner.

In use, the derrick unit B is also operated in a similar manner to the previously described derrick unit A. The mast assembly M' will rotate with respect to the support 290, but as the derrick unit B does not employ the link 128 the main boom 307 will only pivot with respect to the mast assembly.

It is possible to provide another modified form of a single boom derrick unit C, substantially as shown in FIGS. 29 to 32, which is substantially similar to the previously described single boom derrick unit A, except that the derrick unit C includes an operator seat and the necessary control devices mounted on top of the mast assembly.

The derrick unit C includes a derrick mast assembly 335 comprising an upstanding stationary mast support 336 and rotatably mounted thereon is a mast housing 337, and which is substantially identical to the previously described mast assembly M. The mast housing 337 is integrally formed with a pair of spaced upstanding ears 338, 339, and extending transversely thereacross is a pin or pintle 340 which is journaled in bearing sleeves 341, 342, which are, in turn, mounted within the upstanding ears 338, 339, respectively. Pivotally mounted on the pin 340 is a link 343 which is substantially identical to the previously described link 128 and includes a pair of spaced parallel triangularly shaped plates 344, 345, each having a forwardly projecting ear 346, 347, respectively. The ears 346, 347, are maintained in spaced relationship on the pin 340 by means of a pair of set collars 348, 349.

Mounted on the rearward end of the link 343 is a boom assembly 350 which is substantially identical to the previously described boom 175. Also mounted in and extending between the plates 344, 345, in the manner as previously described in connection with the link 128, is a cable winch 351 which is powered by a reversible hydraulic motor 352. The hydraulic motor 352 is conventional and, therefore, neither illustrated nor described in detail herein.

Welded to the underside of the mast housing 337 and extending forwardly and laterally outwardly therefrom, in the manner as shown in FIG. 30, is a platform or base 353 which is reinforced by a pair of gusset plates 354, welded to the platform 353 and to the vertical walls of the mast housing 337. Welded to and extending around a portion of the peripheral margin of the platform 353 is a vertical wall 355 preferably formed of sheet metal and which integrally merges at its outer end into a pedestal 356 having a somewhat rectangular cross-section. The pedestal 356 is further reinforced by a pair of L-shaped vertical support brackets 357 and welded to the upper end of the pedestal 356 is a bucket-type operator's seat 358. By reference to FIG. 30, it can be seen that the platform 353 is L-shaped and has a rearwardly extending portion 359 which is laterally spaced from the boom assembly 350 so that the operator sitting within the operator's seat 358 can view the outer end of the boom assembly 350 and thereby keep the entire operation in view. Welded to each of the sides of the rearwardly extending portion 359 and extending outwardly therefrom is a set of stirrups 360 upon which the operator can rest his feet. The platform 353 is also provided with a set of grab-handles 361 in order to provide a means for climbing up to the operator's seat 358. By reference to FIG. 30, it can be seen that the platform 353 is preferably formed of a corrugated material, such as the type normally used in work platforms.

A horizontal plate, or so-called "false-bottom" plate 362 is spaced downwardly from and secured to the underside of the platform 353 by means of U-shaped brackets 363 and is further reinforced by a set of L-shaped brackets 364 to form a valve housing 365. Welded or otherwise rigidly secured to the rearward end of the rearwardly extending portion 359 is a control panel 366 which is spaced from the bucket-type seat 358. The control system and hydraulic circuitry for the single boom derrick unit C is identical to the control system 261 for the derrick unit A, except that the control valves forming part of the control system are mounted in close proximity to the operator's seat 358 rather than on the support 3. Disposed within the valve housing 365 immediately beneath the control panel 366 are the control valves 264, 265, 274, 276, 278, 280, forming part of the control system 261, and each of which is provided with outwardly extending stems 367. Secured to the stems 367 by means of couplings 368 are control rods 369. The control rods 369 are each connected to separate links 370, all of which are interconnected by a transversely extending pin 371 and connected to each of the seven links 370 are control handles 372, all of which extend outwardly of the control panel 366.

Disposed within the valve housing 365 immediately beneath the operator's seat 358 is the winch control valve 268 and the accessory control valve 272, forming part of the control system 261. Each of the valves 268, 272, includes an outwardly extending stem 373, to which is connected control rods 374, 375, by means of couplings 376, all in the manner as shown in FIG. 31. Each of the aforementioned control valves is connected in the manner as schematically shown in FIG. 24.

Thus, it can be seen that the single boom derrick unit C is operated in a manner similar to the single boom derrick unit A except that the controls are located in close proximity to the operator's seat 358 and are conveniently operated by an operator on the platform 353. It should be understood, however, that the operator's seat and control device could be mounted on the derrick unit B in the same manner as it is mounted on the derrick unit A.

It is possible to provide a further modified form of single boom derrick unit D which includes a man-carrying basket attachment 377 as shown in FIGS. 33 to 37. While the basket attachment 377 is shown with the derrick unit A it should be understood that the basket attachment 377 could be used with either of the single boom derrick units A or B. The basket attachment 377 comprises a bracket 378 having a clevised forward end 379 which is integrally formed with a rearwardly extending tubular arm 380. The clevised forward end 379 includes a pair of spaced parallel arms 381 which are adapted to engage the exterior surfaces of the sheave plates 249, 250. The arms 381 are provided with apertures 382, 383 which lie in registration with the pins 251, 255. By removing the pins 251, 255, from the sheave plates 249, 250, and reinserting the pins through the apertures 382, 383, and the aligned apertures in the sheave plates 249, 250 when the arms 381 are marginally aligned therewith, the basket attachment 377 can be rigidly secured to the outer end of the auxiliary boom 200, all in the manner as shown in FIG. 33.

Inserted in the open end of the tubular arm 380 and rigidly secured thereto by means of a series of bolts 384 is an elongated tubular dielectric support rod 385 which is opened at its outer end for accommodating a sheave block assembly 386. The sheave block assembly 386 consists of a U-shaped bracket 387 having a pair of parallel arms 388, 389, which are integrally welded to a vertical plate 390 at their forward ends. The plate 390 is integrally provided with an extended connecting rod 391 which is inserted into the open end of the support rod 385 and is secured thereto by means of bolts 392. Extending between and journaled in each of the parallel arms 388, 389, in any conventional manner, is a removable pin or pintle 393 for rotatably supporting a sheave or pulley 394.

The support rod 385 is suitably apertured to accommodate a transversely extending tubular basket support rod 395 which is integrally formed with a diametrally enlarged boss 396. Rockably mounted on the rod 395 is a U-shaped basket support 397 which is held in endwise abutting engagement with the boss 396 by means of a set collar 398 and is further reinforced by a set of gussets 399. Inserted into the open end of the tubular rod 395 is a solid plug 400 which accommodates a nut 401 and washer 402 for retaining a locking nut 403 on a threaded portion of the rod 395. The locking nut 403 is provided with a set of outwardly extending handles 404 and is provided with an annular flange 405. The enlarged boss 396 is also formed with a matching annular flange 406 and mounted on the rod 395 between each of the flanges 405, 406, is a pair of brake disks 407 preferably formed of asbestos and interposed between each of the disks 407 is a rubber washer 408 which serves as a suitable breaking means when the nut 403 is threadedly tightened on the threaded portion of the rod 395.

Rigidly secured to the lower end of the basket support 397 is a bracket 409 for supporting a man-carrying basket 410, the latter preferably being formed of fiber glass or other suitable dielectric material. Formed with the basket 410 and bolted to the bracket 409 is an extended flange 411 which is preferably formed of a heavy wood pole such as oak or hickory and is fiber glass covered. The basket 410 comprises a downwardly tapering framework 412 having a floor 413, the latter being preferably fabricated from any suitable floor material, such as heavy gauge screen wire, since this type of floor construction readily adapts itself to convenient cleaning. The basket 410 is sized to permit a workman ample freedom therein and may also be provided with conventional brackets and attachments, not shown, for holding tools thereon.

By means of this construction, it can be seen that the dielectric support rod 385 completely insulates the basket 410 from the derrick unit A. This feature, of course, is desirable in that it prevents the electrical line man from exposing himself to substantial danger from charged electrical lines. Moreover, it is to be noted that the sheave block assembly 386 is located in close proximity to the basket 410, thereby enabling the workman in the basket 410 to conveniently handle any piece of equipment which may be loaded on a cable connected to the sheave 394. The cable 171 may also be trained around the sheave 394 and operated by the previously described reversible hydraulic motor 170. This arrangement is most suitable for mounting electrical transformers and similar pieces of equipment on telephone poles and similar utility poles. By this construction, the workman in the basket may, by a suitable control system to be hereinafter described, lift a piece of equipment such as a transformer to the desired height, merely by controlling the position of the derrick unit D. He is then able to install this piece of equipment in a convenient and relatively hazardous free manner. It should be obvious, by means of the above-outlined construction, that the basket assembly 410 could conveniently be mounted on the removable pin or pintle 393, if desired.

In order to secure the basket 410 in a "transport" position, the lower end of the flange 411 is provided with a bracket 414 which includes an outwardly extending striker plate 415, the latter being suitably provided with an aperture 416. When the basket 410 is swung upwardly to its transport position, the aperture 416 will suitably engage a pin 417 forming part of a locking mechanism 418. The locking mechanism 418 includes a support plate 419 attached to the bracket 378 and having a pair of flanges 420. The pin 417 is mounted within the flanges 420 and spring-biased rearwardly by means of a spring 421. Thus, when it is desired to lock the basket 410 in the "transport" position, the basket 410 is swung upwardly until the pin 417 engages the aperture 416. When it is desired to release the basket 410 and move the same to its "work" position, that is the position as shown in the solid lines of FIG. 33, the pin 417 is pulled forwardly releasing it from engagement with the aperture 416, and thereby permitting the basket 410 to swing downwardly to its "work" position. It can be seen that the basket 410 is swingable on the support rod 385 and that if the rod 385 is located at any angular position with respect to the ground, the basket will always maintain a truly upright position. Moreover, the basket 410 can be locked in any desired position merely by turning the locking nut 403.

The single boom derrick unit D is provided with a control system 422 shown schematically in FIG. 38, and which is substantially similar to the previously described control system 261, employed in the derrick units A, B, and C. The control system 422 includes a high pressure pump 423 which is supplied with hydraulic fluid from a reservoir or sump 424 and which is conveniently mounted on the derrick support frame 3. Hydraulically connected to the pump 423, in the manner as schematically shown in FIG. 38, is a pair of two-way three-position outrigger control valves 425, 426, a two-way three-position auxiliary control valve 427, a two-way three-position winch control valve 428, a two-way three-position link control valve 429, a two-way three-position main boom control valve 430, a two-way three-position auxiliary boom control valve 431, and a two-way three-position mast assembly control valve 432. The valves 425, 426, 427, 428, 429, 430, 431, and 432 are all operatively mounted on the derrick support frame 3 in the manner as each of the control valves in the circuit 261 were mounted on the support frame 3. Therefore, it can be seen that each of the hydraulically operated components of the single boom derrick unit D can be operated by the controls from an operator standing alongside of the truck upon which the derrick unit D is mounted.

Each of the aforementioned control valves 425–432 are conventional and, therefore, neither illustrated nor described in detail herein. However, each of these control valves are provided with handles 433 for operation at the base of the support frame 3 and, moreover, are provided with outwardly extending plungers 434 which are connected to, and movable with, the piston or movable element forming part of the valves. Connected to, and operable by, the plungers 434 of each of the control valves 429, 430, 431, 432, are "slave valves" 435, 436, 437, 438, respectively. The basket 410 is integrally formed with an outwardly extending flange 439 and bolted thereto is a metallic bracket 440 for rigidly supporting four remote control valves 441, 442, 443, 444, which are hydraulically connected to the slave valves 435, 436, 437, 438, respectively, all as schematically shown in FIG. 38. The remote control valves 441, 442, 443, 444, are conventional and, therefore, neither illustrated nor described in detail and are provided with extended control handles 445. Thus, by means of the above-outlined construction, it can be seen that the remote-control valve 441 will operate the hydraulic ram 148 for swinging the link 128; the remote control valve 442 will operate the hydraulic ram 191 for swinging the main boom 175; the remote control valve 443 will operate the hydraulic ram 201 for extending the auxiliary boom 200; and remote control valve 444 will operate the hydraulic motor 102 for swinging the mast assembly M. It can thus be seen, that the single boom derrick unit D can be operated either from the man-carrying basket 410 or from the controls which are mounted alongside the derrick support frame 3. The remote control system employed in the single boom derrick unit D is more fully described in the Dynex, Inc., Service Information booklet, copyrighted 1961, for the "Dynamaster" hydraulic remote control system.

It should be understood that changes and modifications in the form, construction, arrangement, and combination of the several parts of the single boom derrick units may be made and substituted for those herein shown and described without departing from the nature and principle of our invention.

Having thus described our invention, what we claim and desire to secure by Letters Patent is:

1. A single boom derrick unit for mobile platforms and the like, said derrick unit comprising support means, a mast assembly rotatably mounted on said support means, a boom operatively mounted on said mast assembly and being adapted to swing through an arc in a vertical plane with respect to said mast assembly, said boom having a first section pivotally connected at a first pivot point to the mast assembly and a second section which is pivotally connected to the first section at a second pivot point, said first pivot point and second pivot point lying within the same horizontal plane when said first section is extended in a horizontal position, said first section being provided with an offset portion that projects outwardly and downwardly from the second pivot point when said first and second pivot points lie in a substantially horizontal plane, said offset portion having a third pivot point that lies downwardly and outwardly from the second pivot point when said first and second pivot points lie in a substantially horizontal plane, first hydraulic ram means connected to the mast assembly and to the third pivot point for swinging said first section with respect to said mast assembly, second hydraulic ram means connected to the third pivot point and the second section for swinging it with respect to the first section, and hydraulic motor means mounted within and being operatively connected to said mast assembly for rotating said mast assembly with respect to said support means.

2. A single boom derrick unit for mobile platforms and the like, said derrick unit comprising support means, a mast assembly rotatably mounted on said support means, a link member pivotally mounted on said mast assembly at a first pivot point, a boom pivotally mounted on said link member at a second pivot point and being adapted to swing through an arc in a vertical plane with respect to said mast assembly, said link member having an offset portion that projects outwardly and downwardly from the second pivot point, said offset portion having a third pivot point which lies outwardly and downwardly from the second pivot point when the first and second pivot points lie in a substantially horizontal plane, first hydraulic ram means operatively connected to said mast assembly and the third pivot point for swinging said link member with respect to said mast assembly, second hydraulic ram means operatively connected to said link member, and to said boom for swinging said boom with respect to said link member, and hydraulic motor means mounted within and being operatively connected to said mast assembly for rotating said mast assembly with respect to said support means.

3. A single boom derrick unit for mobile platforms and the like, said derrick unit comprising support means, a mast assembly rotatably mounted on said support means, a link member pivotally mounted on said mast assembly at a first pivot point, a boom pivotally mounted on said link member and being adapted to swing through an arc in a vertical plane with respect to said mast assembly, said link member having an offset portion that projects outwardly and downwardly from the second pivot point, said offset portion having a third pivot point which lies outwardly and downwardly from the second pivot point when the first and second pivot points lie in a substantially horizontal plane, first hydraulic ram means operatively connected to said mast assembly and the third pivot point at the outer end of said link member for swinging said link member with respect to said mast assembly, second hydraulic ram means operatively connected to said third pivot point on the offset portion of said link member for swinging said boom with respect to said link member; and hydraulic motor means mounted within and being operatively connected to said mast assembly for rotating said mast assembly with respect to said support means.

4. A single boom derrick unit for mobile platforms and the like, said derrick unit comprising support means, a mast assembly rotatably mounted on said support means, a link member pivotally mounted on said mast assembly at a first pivot point, a boom pivotally mounted at a second pivot point to said link member and being adapted to swing through an arc in a vertical plane with respect to said mast assembly, said link member having an offset portion that projects outwardly and downwardly from the first and second pivot points when said pivot points lie in a substantially horizontal plane, said offset portion having a third pivot point which lies outwardly and downwardly from the first and second pivot points when said pivot points lie in a substantially horizontal plane, first hydraulic ram means operatively connected to the mast assembly below the first pivot point and to the third pivot point for swinging said link member with respect to said mast assembly, said third pivot point lying outwardly and downwardly from the first and second pivot points when the first hydraulic ram means is retracted and lying above the first and second pivot points when the first hydraulic ram means is fully extended, second hydraulic ram means operatively connected to the third pivot point and to the boom for swinging the boom with respect to said link member, and hydraulic motor means mounted within and being operatively connected to said mast assembly for rotating said mast assembly with respect to said support means.

5. A single boom derrick unit for mobile platforms and the like, said derrick unit comprising support means, a mast assembly rotatably mounted on said support means, a link member pivotally mounted on said mast assembly at a first pivot point, a boom pivotally mounted at a second pivot point to said link member and being adapted to swing through an arc in a vertical plane with respect to said mast assembly, said link member having an offset portion that projects outwardly and downwardly from the first and second pivot points when said pivot points lie in a substantially horizontal plane, said offset portion having a third pivot point which lies outwardly and downwardly from the first and second pivot points when said pivot points lie in a substantially horizontal plane, first hydraulic ram means operatively connected to said mast assembly below the first pivot point and said third pivot point for swinging said link member with respect to said mast assembly, said third pivot point lying outwardly and downwardly from the first and second pivot points when the first hydraulic ram means is retracted and lying above the first and second pivot points when the first hydraulic ram means is fully extended, second hydraulic ram means operatively connected to the third pivot point and to the boom for swinging the boom with respect to said link member, hydraulic motor means mounted within and being operatively connected to said mast assembly for rotating said mast assembly with respect to said support means, an auxiliary boom disposed within said main boom and being adapted for extensible movement out of the free end of said main boom, and third hydraulic ram means mounted within said auxiliary boom and being pivotally connected to said main boom and auxiliary boom for extending said auxiliary boom with respect to said main boom.

6. A single boom derrick unit for mobile platforms and the like, said derrick unit comprising support means, a mast assembly rotatably mounted on said support means, a link member pivotally mounted on said mast assembly, a main boom pivotally mounted on said link member and being adapted to swing through an arc in a vertical plane with respect to said mast assembly, first hydraulic ram means operatively connected to said mast assembly and the outer end of said link member for swinging said link member with respect to said mast assembly, second hydraulic ram means operatively connected to said link member, and to said main boom for swinging said main boom with respect to said link member, hydraulic motor means mounted within and being operatively connected to said mast assembly for rotating said mast assembly with respect to said support means, an auxiliary boom disposed within said main boom and being adapted for extensible movement out of the free end of said main boom, and third hydraulic ram means mounted within said auxiliary boom and being pivotally connected to said main boom and auxiliary boom for extending said auxiliary boom with respect to said main boom.

7. A single boom derrick unit for mobile platforms and the like, said derrick unit comprising support means, a mast assembly rotatably mounted on said support means, a link member pivotally mounted on said mast assembly, said link member having three pivot points, said link member being secured to said mast assembly at one of said pivot points, a boom pivotally mounted on said link member at the second of said pivot points and being adapted to swing through an arc in a vertical plane with respect to said mast assembly, first hydraulic ram means pivotally connected to the third of said pivot points and to the mast assembly for swinging said link with respect to said mast assembly, second hydraulic ram means operatively connected to the third of said pivot points and to said boom for swinging said boom with respect to said link member, and hydraulic motor means mounted within and being operatively connected to said mast assembly for rotating said mast assembly with respect to said support means.

8. A single boom derrick unit for mobile platforms and the like, said derrick unit comprising support means, a mast assembly rotatably mounted on said support means, a link member pivotally mounted on said mast assembly, said link member having three pivot points, said link member being secured to said mast assembly at one of said pivot points, a boom pivotally mounted on said link member at the second of said pivot points and being adapted to swing through an arc in a vertical plane with respect to said mast assembly, first hydraulic ram means pivotally connected to the third of said pivot points and to the mast assembly for swinging said link with respect to said mast assembly, the point of pivotal connection of said first hydraulic ram means and mast assembly lying in the same horizontal plane when the boom is in a horizontal position, second hydraulic ram means operatively connected to the third of said pivot points and to said boom for swinging said boom with respect to said link member, and hydraulic motor means mounted within and being operatively connected to said mast assembly for rotating said mast assembly with respect to said support means.

9. A single boom derrick unit for mobile platforms and the like, said derrick unit comprising support means, a mast assembly rotatably mounted on said support means, a link member pivotally mounted on said mast assembly, said link member having a first pivot point and being secured to said mast assembly at said first pivot point, said link member having a second pivot point, a boom pivotally mounted on said link member at said second pivot point and being adapted to swing through an arc in a vertical plane with respect to said mast assembly, said second pivot point lying within the same horizontal plane as said first pivot point when said boom is extended in a horizontal position, said link member having a third pivot point which is located in downwardly spaced relation to said first and second pivot points, first hydraulic ram means pivotally connected to the third of said pivot points and to the mast assembly for swinging said link with respect to said mast assembly, the point of pivotal connection of said first hydraulic ram means and mast assembly lying in the same horizontal plane when the boom is in a horizontal position, second hydraulic ram means operatively connected to the third of said pivot points and to said boom for swinging said boom with respect to said link member, and hydraulic motor means mounted within and being operatively connected to said mast assembly for rotating said mast assembly with respect to said support means.

10. A single boom derrick unit for mobile platforms and the like, said derrick unit comprising support means, a mast assembly rotatably mounted on said support means, a link member pivotally mounted on said mast assembly, said link member including two spaced triangularly-shaped plates having a first pivot point and being secured to said mast assembly at said first pivot point, said link member having a second pivot point, a boom pivotally mounted on said link member at said second pivot point and being adapted to swing through an arc in a vertical plane with respect to said mast assembly, said second pivot point lying within the same horizontal plane as said first pivot point when said boom is extended in a horizontal position, said link member having a third pivot point which is located in downwardly spaced relation to said first and second pivot points, first hydraulic ram means pivotally connected to the third of said pivot points and to the mast assembly for swinging said link with respect to said mast assembly, the point of pivotal connection of said first hydraulic ram means and mast assembly lying in the same horizontal plane when the boom is in a horizontal position, second hydraulic ram means operatively connected to the third of said pivot points and to said boom for swinging said boom with respect to said link member, and hydraulic motor means mounted within and being operatively connected to said mast assembly for rotating said mast assembly with respect to said support means.

11. A single boom derrick unit for mobile platforms and the like, said derrick unit comprising support means, a mast assembly rotatably mounted on said support means, a link member pivotally mounted on said mast assembly, said link member including two spaced triangularly-shaped plates having a first pivot point and being secured to said mast assembly at said first pivot point, said link member having a second pivot point, a cable winch operatively mounted in said triangularly-shaped plates, a boom pivotally mounted on said link member at said second pivot point and being adapted to swing through an arc in a vertical plane with respect to said mast assembly, said second pivot point lying within the same horizontal plane as said first pivot point when said boom is extended in a horizontal position, said link member having a third pivot point which is located in downwardly spaced relation to said first and second pivot points, first hydraulic ram means pivotally connected to the third of said pivot points and to the mast assembly for swinging said link with respect to said mast assembly, the point of pivotal connection of said first hydraulic ram means and mast assembly lying in the same horizontal plane when the boom is in a horizontal position, second hydraulic ram means operatively connected to the third of said pivot points and to said boom for swinging said boom with respect to said link member, and hydraulic motor means mounted within and being operatively connected to said mast assembly for rotating said mast assembly with respect to said support means.

12. A single boom derrick unit for mobile platforms and the like, said derrick unit comprising support means, a mast assembly rotatably mounted on said support means, a link member pivotally mounted on said mast assembly, said link member including two spaced triangularly-shaped plates having a first pivot point and being secured to said mast assembly at said first pivot point, said link member having a second pivot point, a cable winch operatively mounted in each of said triangularly-shaped plates, powered means operatively mounted between said plates and being operatively connected to said winch for operating said winch, a boom pivotally mounted on said link member at said second pivot point and being adapted to swing through an arc in a vertical plane with respect to said mast assembly, said second pivot point lying within the same horizontal plane as said first pivot point when said boom is extended in a horizontal position, said link member having a third pivot point which is located in downwardly spaced relation to said first and second pivot points, first hydraulic ram means pivotally connected to the third of said pivot points and to the mast assembly for swinging said link with respect to said mast assembly, the point of pivotal connection of said first hydraulic means and mast assembly lying in the same horizontal plane when the boom is in a horizontal position, second hydraulic ram means operatively connected to the third of said pivot points and to said boom for swinging said boom with respect to said link member, and hydraulic motor means mounted within and being operatively connected to said mast assembly for rotating said mast assembly with respect to said support means.

13. A single boom derrick unit for mobile platforms and the like, said derrick unit comprising support means, a mast assembly rotatably mounted on said support means, a link member operatively mounted on said mast assembly at a first pivot point, a boom pivotally mounted at a second pivot point to said link member and being adapted to swing through an arc in a vertical plane with respect to said mast assembly, said link member having an offset portion that projects outwardly and downwardly from the first and second pivot points when said pivot points lie in a substantially horizontal plane, said offset portion having a third pivot point which lies outwardly and downwardly from the first and second pivot points when said pivot points lie in a substantially horizontal plane, hydraulic ram means operatively connected to said mast assembly and said boom for swinging said boom with respect to said mast assembly, an extensible element operatively mounted within said boom and being adapted for extensible movement out of the free end thereof, roller means mounted on said extensible element and in said boom for supporting the extensible element during its extending and retracting movement, and hydraulic motor means operatively connected to said mast assembly for rotating said mast assembly with respect to said support means.

14. A single boom derrick unit for mobile platforms and the like, said derrick unit comprising support means, a mast assembly rotatably mounted on said support means, a link member pivotally mounted on said mast assembly, a boom pivotally mounted on said link member and being adapted to swing through an arc in a vertical plane with respect to said mast assembly, first hydraulic ram means operatively connected to said mast assembly and the outer end of said link member for swinging said link member with respect to said mast assembly, second hydraulic ram means operatively connected to the outer end of said link member and to said boom for swinging said boom with respect to said link member, a chair assembly rigidly secured to and rotatable with said mast assembly, control means mounted within said chair assembly and being operatively connected to said first and second hydraulic ram means for operating said link member and said boom, and hydraulic motor means mounted within and being operatively connected to said mast assembly for rotating said mast assembly with respect to said support means.

References Cited in the file of this patent

UNITED STATES PATENTS

| | | |
|---|---|---|
| 2,167,026 | Hatch | July 25, 1939 |
| 2,588,520 | Halgren et al. | Mar. 11, 1952 |
| 2,599,991 | Hegre | June 10, 1952 |
| 2,786,723 | Harsch | Mar. 26, 1957 |
| 2,787,383 | Antos et al. | Apr. 2, 1957 |
| 2,830,561 | Lindstrom | Apr. 15, 1958 |
| 2,838,183 | McIntyre | June 10, 1958 |
| 2,841,960 | Holan et al. | July 8, 1958 |
| 2,915,137 | Troche | Dec. 1, 1959 |
| 3,047,160 | Paul | July 31, 1962 |
| 3,051,323 | Kuhlenschmidt et al. | Aug. 28, 1962 |

FOREIGN PATENTS

| | | |
|---|---|---|
| 1,052,658 | Germany | Mar. 12, 1959 |